United States Patent
Wu et al.

(10) Patent No.: US 9,633,233 B2
(45) Date of Patent: Apr. 25, 2017

(54) METHOD AND COMPUTING DEVICE FOR ENCRYPTING DATA STORED IN SWAP MEMORY

(71) Applicant: SanDisk Technologies Inc., Plano, TX (US)

(72) Inventors: Robert S. Wu, Milpitas, CA (US); Jian Chen, Menlo Park, CA (US); Ashish Karkare, Milpitas, CA (US); Alon Marcu, Tel Mond (IL); Vsevolod Mountaniol, Givataim (IL)

(73) Assignee: SanDisk Technologies LLC, Plano, TX (US)

( * ) Notice: Subject to any disclaimer, the term of this patent is extended or adjusted under 35 U.S.C. 154(b) by 126 days.

(21) Appl. No.: 14/272,255

(22) Filed: May 7, 2014

(65) Prior Publication Data

US 2016/0117260 A1    Apr. 28, 2016

(51) Int. Cl.
*G06F 11/30* (2006.01)
*G06F 21/79* (2013.01)
*G06F 12/02* (2006.01)
*G06F 12/0862* (2016.01)

(52) U.S. Cl.
CPC ............ *G06F 21/79* (2013.01); *G06F 12/023* (2013.01); *G06F 12/0862* (2013.01); *G06F 2212/7201* (2013.01)

(58) Field of Classification Search
CPC .............. G06F 12/023; G06F 12/0238; G06F 12/0246; G06F 12/0862; G06F 9/30047; G06F 9/3004; G06F 2212/7201
USPC .......................................................... 713/193
See application file for complete search history.

(56) References Cited

U.S. PATENT DOCUMENTS

| | | | |
|---|---|---|---|
| 6,581,133 B1 | 6/2003 | Bitner et al. | |
| 6,933,919 B1 | 8/2005 | Anderson et al. | |
| 7,003,621 B2 | 2/2006 | Koren | |
| 7,110,301 B2 | 9/2006 | Lee | |
| 7,315,916 B2 | 1/2008 | Bennett | |
| 7,433,951 B1 | 10/2008 | Waldspurger | |
| 7,826,469 B1 | 11/2010 | Li et al. | |
| 8,112,755 B2 * | 2/2012 | Apacible ............... | G06F 9/4843 718/104 |
| 8,187,936 B2 | 5/2012 | Alsmeier et al. | |
| 8,261,009 B2 | 9/2012 | Freikorn | |
| 8,554,986 B2 | 10/2013 | Lee | |
| 8,694,754 B2 | 4/2014 | Schuette | |

(Continued)

FOREIGN PATENT DOCUMENTS

DE    10 2004 055051 B3    10/2005

OTHER PUBLICATIONS

International Search Report and Written Opinion for PCT/US2015/024843 dated Jul. 27, 2015, 9 pages.

(Continued)

*Primary Examiner* — Samson Lemma
(74) *Attorney, Agent, or Firm* — Brinks Gilson & Lione

(57) ABSTRACT

The following embodiments generally relate to the use of a "swap area" in a non-volatile memory as an extension to volatile memory in a computing device. These embodiments include techniques to use both volatile memory and non-volatile swap memory to pre-load a plurality of applications, to control the bandwidth of swap operations, to encrypt data stored in the swap area, and to perform a fast clean-up of the swap area.

17 Claims, 19 Drawing Sheets

(56) References Cited

U.S. PATENT DOCUMENTS

| | | | |
|---|---|---|---|
| 8,738,840 B2 | 5/2014 | Tzeng | |
| 8,819,337 B1 | 8/2014 | Oshinsky et al. | |
| 8,898,374 B2 | 11/2014 | Yang | |
| 8,909,888 B2 | 12/2014 | Goss et al. | |
| 8,972,675 B2 | 3/2015 | Avila et al. | |
| 9,053,019 B2 | 6/2015 | Roh | |
| 2002/0134222 A1 | 9/2002 | Tamura | |
| 2004/0030882 A1* | 2/2004 | Forman | G06F 9/445 713/100 |
| 2004/0068627 A1 | 4/2004 | Sechrest et al. | |
| 2006/0083069 A1* | 4/2006 | Fasoli | G11C 5/04 365/185.19 |
| 2006/0123320 A1 | 6/2006 | Vogt | |
| 2007/0005883 A1 | 1/2007 | Trika | |
| 2007/0016725 A1 | 1/2007 | Chu et al. | |
| 2007/0055813 A1 | 3/2007 | Ingram et al. | |
| 2007/0168632 A1 | 7/2007 | Zeevi | |
| 2007/0226443 A1* | 9/2007 | Giampaolo | G06F 17/30144 711/170 |
| 2008/0059785 A1 | 3/2008 | O'Connell | |
| 2008/0074931 A1 | 3/2008 | Kim | |
| 2009/0083478 A1 | 3/2009 | Kunimatsu et al. | |
| 2009/0113444 A1 | 4/2009 | Hackborn | |
| 2009/0119450 A1 | 5/2009 | Saeki et al. | |
| 2009/0172255 A1 | 7/2009 | Yeh et al. | |
| 2009/0198874 A1 | 8/2009 | Tzeng | |
| 2009/0222639 A1 | 9/2009 | Hyvonen et al. | |
| 2009/0240873 A1 | 9/2009 | Yu et al. | |
| 2009/0291696 A1 | 11/2009 | Cortes et al. | |
| 2010/0064111 A1 | 3/2010 | Kunimatsu et al. | |
| 2010/0075760 A1 | 3/2010 | Shimabukuro et al. | |
| 2010/0118434 A1 | 5/2010 | Inoue | |
| 2010/0169540 A1 | 7/2010 | Sinclair | |
| 2010/0191874 A1 | 7/2010 | Feeley et al. | |
| 2010/0274955 A1 | 10/2010 | Lasser et al. | |
| 2011/0010722 A1 | 1/2011 | Matsuyama | |
| 2011/0066792 A1* | 3/2011 | Shaeffer | G06F 12/0246 711/103 |
| 2011/0145490 A1 | 6/2011 | Lee et al. | |
| 2011/0213954 A1 | 9/2011 | Baik | |
| 2011/0302224 A1 | 12/2011 | Yairi et al. | |
| 2012/0167100 A1 | 6/2012 | Li et al. | |
| 2012/0198174 A1 | 8/2012 | Nellans et al. | |
| 2012/0254520 A1 | 10/2012 | Roh | |
| 2012/0254966 A1 | 10/2012 | Parker | |
| 2012/0303865 A1* | 11/2012 | Hars | G06F 12/0246 711/103 |
| 2012/0324481 A1 | 12/2012 | Xia et al. | |
| 2013/0031298 A1 | 1/2013 | Tan et al. | |
| 2013/0046921 A1 | 2/2013 | Pyeon | |
| 2013/0067138 A1 | 3/2013 | Schuette et al. | |
| 2013/0132638 A1 | 5/2013 | Horn et al. | |
| 2013/0270643 A1 | 10/2013 | Lee et al. | |
| 2013/0305247 A1 | 11/2013 | Easton et al. | |
| 2013/0311751 A1* | 11/2013 | Kurihara | G06F 9/3877 712/28 |
| 2013/0326113 A1 | 12/2013 | Wakrat et al. | |
| 2013/0326116 A1 | 12/2013 | Goss et al. | |
| 2014/0129758 A1 | 5/2014 | Okada | |
| 2014/0229605 A1 | 8/2014 | Besser | |
| 2014/0331010 A1 | 11/2014 | Rankin et al. | |
| 2015/0026415 A1 | 1/2015 | Clausen et al. | |
| 2015/0178188 A1 | 6/2015 | Grin et al. | |
| 2015/0293701 A1 | 10/2015 | Kim et al. | |

OTHER PUBLICATIONS

Office Action for U.S. Appl. No. 14/272,251 dated Sep. 18, 2015, 31 pages.
Office Action for U.S. Appl. No. 14/272,238 dated Jan. 12, 2016, 72 pages.
Office Action for U.S. Appl. No. 14/272,244 dated Dec. 31, 2015, 52 pages.
Office Action for U.S. Appl. No. 14/272,257 dated Jan. 8, 2016, 7 pages.
Arya, P., "A Survey of 3D Nand Flash Memory", *EECS Int'l Graduate Program, National Chiao Tung University*, 2012, pp. 1-11.
Jang et al., "Vertical Cell Array using TCAT(Terabit Cell Array Transistor) Technology for Ultra High Density NAND Flash Memory," *2009 Symposium on VLSI Technology Digest of Technical Papers*, pp. 192-193, 2009.
Nowak, E. et al., "Intrinsic Fluctuations in Vertical NAND Flash Memories", *2012 Symposium on VLSI Technology Digest of Technical Papers*, 2012, pp. 21-22.
"Write Amplification", http://en.wikipedia.org/wiki/Write_amplification, 13 pages, printed Mar. 9, 2013.
Application as Filed for U.S. Appl. No. 13/800,256 entitled, "Mobile Computing Device and Method for Dynamic Application Hibernation Implemented with Non-Linux Operating System", filed Mar. 13, 2013, 41 pages.
Application as Filed for U.S. Appl. No. 13/800,330 entitled, "Mobile Computing Device and Method for Dynamic Application Hibernation Implemented with Function Calls Sent From an Application Management Layer Running in a User Space to an Operating System Kernel", filed Mar. 13, 2013, 41 pages.
Application as Filed for U.S. Appl. No. 13/829,010 entitled, "Storage Module and Method for Regulating Garbage Collection Operations based on Write Activity of a Host", filed Mar. 14, 2013, 23 pages.
Application as Filed for U.S. Appl. No. 14/219,868 entitled, "Computing Device and Method for Predicting Low Memory Conditions", filed Mar. 19, 2014, 33 pages.
Application as Filed for U.S. Appl. No. 14/133,979, filed Dec. 19, 2013, 121 pages.
Application as Filed for U.S. Appl. No. 14/136,103, filed Dec. 20, 2013, 56 pages.
Application as Filed for U.S. Appl. No. 14/254,393 entitled, "Storage Module and Method for Adaptive Burst Mode", filed Apr. 16, 2014, 31 pages.
Office Action for U.S. Appl. No. 14/254,393 dated Jun. 16, 2014, 18 pages.
Office Action for U.S. Appl. No. 14/272,251, dated May 5, 2016, 35 pages.
Office Action in U.S. Appl. No. 14/272,257 dated Jul. 21, 2016, 8 pages.
Office Action in U.S. Appl. No. 14/272,244 dated Aug. 12, 2016, 69 pages.
Office Action in U.S. Appl. No. 14/272,251 dated Nov. 17, 2016, 26 pages.
"IBM Knowledge Center—How Paging Works in z/OS", printed from the internet: www.ibm.com/support/knowledgecenter/zosbasics/com.ibm.zos.zconcepts/zconcepts_91.htm , Nov. 21, 2016, 2 pages.
Kay, T., "Linux Swap Space", *Linux Journal*, Feb. 28, 2011, 5 pages.
Office Action in U.S. Appl. No. 14/272,244, dated Dec. 5, 2016, 44 pages.
Office Action in U.S. Appl. No. 14/272,238 dated Sep. 8, 2016, 81 pages.

* cited by examiner

US 9,633,233 B2

METHOD AND COMPUTING DEVICE FOR ENCRYPTING DATA STORED IN SWAP MEMORY

BACKGROUND

Today, one of the main trends with mobile computing devices, such as smartphones and tablets, is the ever-increasing demand for mobile volatile memory (e.g., DRAM), which has gone from 256 K to a few gigabytes and is still rising. With DRAM scaling slowing down, there is a burden on a mobile computing device to effectively use its DRAM. One of these burdens is the number of applications (or "apps") that can be loaded into the DRAM. To launch an application, a processor in the computing device loads computer-readable program code for the application from non-volatile memory (e.g., Flash memory) into volatile memory (e.g., DRAM) and then executes the code. Executing the code can create application data, which is also stored in the volatile memory. The time required to launch an application may be seen as an inconvenience by some users, so some computing devices are designed to automatically pre-load a set of applications into the DRAM during the boot-up process of the computing device, when the user is normally expecting there to be some delay. By being pre-loaded, the user is able to almost instantly access an application after power-up rather than waiting for the application to launch from scratch. Because a computing device has a limited amount of DRAM, there is a limit as to the number of applications that can be pre-loaded into DRAM. As such, unless an application is among the limited number pre-loaded into DRAM, a user will experience some delay in waiting for the application to launch.

OVERVIEW

Embodiments of the present invention are defined by the claims, and nothing in this section should be taken as a limitation on those claims.

In one embodiment, a method and computing device are disclosed for using both volatile memory and non-volatile swap memory to pre-load a plurality of applications. In one method, a plurality of applications are pre-loaded in volatile memory in the computing device until it is determined that available space in the volatile memory has dropped below a threshold level. An application is pre-loaded in the volatile memory by copying application code for the application from the non-volatile memory into the volatile memory, executing the application code from the volatile memory, and storing created application data in the volatile memory. When it is determined that the available space in the volatile memory has dropped below the threshold level, the application data for at least one application is moved from the volatile memory to the non-volatile memory.

In another embodiment, a method and computing device are disclosed for bandwidth control of a swap operation. In one method, a plurality of applications are loaded in volatile memory in the computing device. An application is loaded in the volatile memory by copying application code for the application from the non-volatile memory into the volatile memory, executing the application code from the volatile memory, and storing created application data in the volatile memory. A bandwidth at which the application data for at least one application should be moved from the volatile memory to the non-volatile memory during a swap operation is determined, and the application data for the at least one application is moved from the volatile memory to the non-volatile memory during a swap operation according to the determined bandwidth.

In another embodiment, a method and computing device are disclosed for encrypting data stored in a swap area. In one method, an application is loaded in the volatile memory by copying application code for the application from the non-volatile memory into the volatile memory, executing the application code from the volatile memory, storing created application data in the volatile memory. The application data for the application is moved from the volatile memory to the non-volatile memory during a swap operation, and the application data is encrypted before it is stored in the non-volatile memory.

In another embodiment, a method and computing device are disclosed for fast erase of a swap area in a non-volatile memory. In one method, a controller of a storage module is in communication with a processor of a computing device, and the storage module has a non-volatile memory with a swap area storing data that was swapped out of a volatile memory of the computing device. The controller of the storage module receives a multi-block erase command from the processor of the computing device to erase the plurality of blocks in the swap area in non-volatile memory and, in response to receiving the command, simultaneously erases all of the plurality of blocks.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

The following embodiments generally relate to the use of a "swap area" in a non-volatile memory as an extension to volatile memory in a computing device. These embodiments include techniques to use both volatile memory and non-volatile swap memory to pre-load a plurality of applications, to control the bandwidth of swap operations, to encrypt data stored in the swap area, and to perform a fast clean-up of the swap area. These embodiments can be used alone or in combination with one another, and other embodiments are provided. Before turning to these and other embodiments, the following section provides a discussion of exemplary computing and storage devices that can be used with these embodiments. Of course, these are just examples, and other suitable types of computing and storage devices can be used.

Exemplary Computing and Storage Devices

Figure 1:
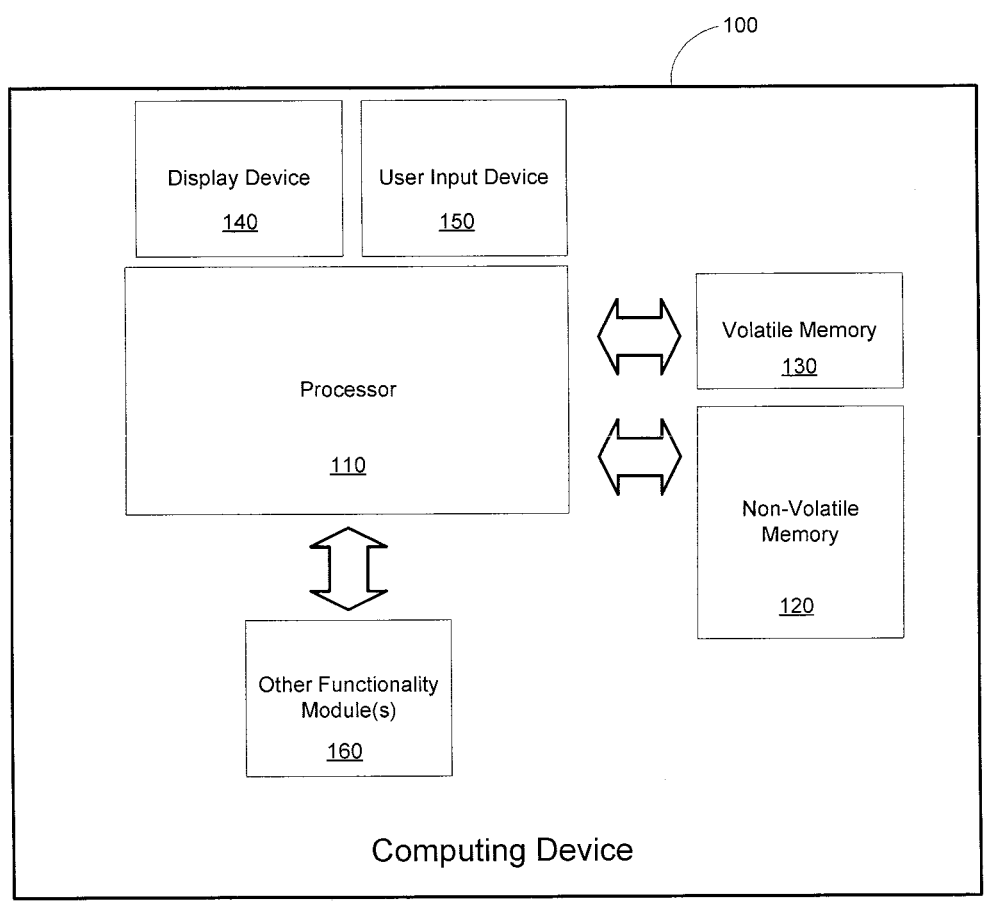
FIG. 1 is a block diagram of an exemplary computing device of an embodiment.

Turning now to the drawings, FIG. 1 is a block diagram of computing device 100 of an embodiment. As shown in FIG. 1, the computing device 100 comprises a processor 110, non-volatile memory 120, volatile memory 130 (e.g., RAM), a display device 140, a user input device 150, and one or more optional other functionality module(s) 160. The computing device 100 can take any suitable form, such as, but not limited to, a mobile phone, a tablet computer, a digital media player, a game device, a personal digital assistant (PDA), a mobile (e.g., notebook, laptop) personal computer (PC), a book reader, or any combination thereof. The computer device 100 can be a mobile or non-mobile (e.g., desktop, set-top) device. The user input device 150 can also take any suitable form and can be separate from or integrated with the display device 140. For example, the user input device 150 can be a physical keyboard or can be a touch-sensitive surface on the display device 140. The optional other functionality module(s) 160 can also take any suitable form, depending on the nature of the computing device 100. For example, if the computing device 100 is a mobile phone, the other functionality module(s) 160 can include hardware and/or software components to make and place telephone calls. As another example, if the computing device 100 has network connectivity capabilities, the other functionality module(s) 160 can include a network interface.

Of course, these are just some examples, and other implementations can be used. Also, the computing device 100 can include other components (e.g., an audio output, input-output ports, etc.) that are not shown in FIG. 1 to simplify the drawings.

The processor 110 is responsible for running the general operation of the computing device 100. This includes, for example, running an operating system, as well as various applications. The computer-readable program code for the operating system and applications can be stored in the non-volatile memory 120 and then loaded into the volatile memory 130 for execution. The following embodiments provide several examples of methods that can be performed by the processor 110.

The non-volatile and volatile memories 120, 130 can take any suitable form. For example, the volatile memory 130 can use any current or future technology for implementing random access memory (RAM) (or dynamic random access memory (DRAM)). In one embodiment, the non-volatile memory 120 takes the form of a solid-state (e.g., flash) memory and can be one-time programmable, few-time programmable, or many-time programmable. The non-volatile memory 120 can be two-dimensional or three-dimensional and can use single-level cell (SLC), multiple-level cell (MLC), triple-level cell (TLC), or other memory technologies, now known or later developed.

Figure 2:
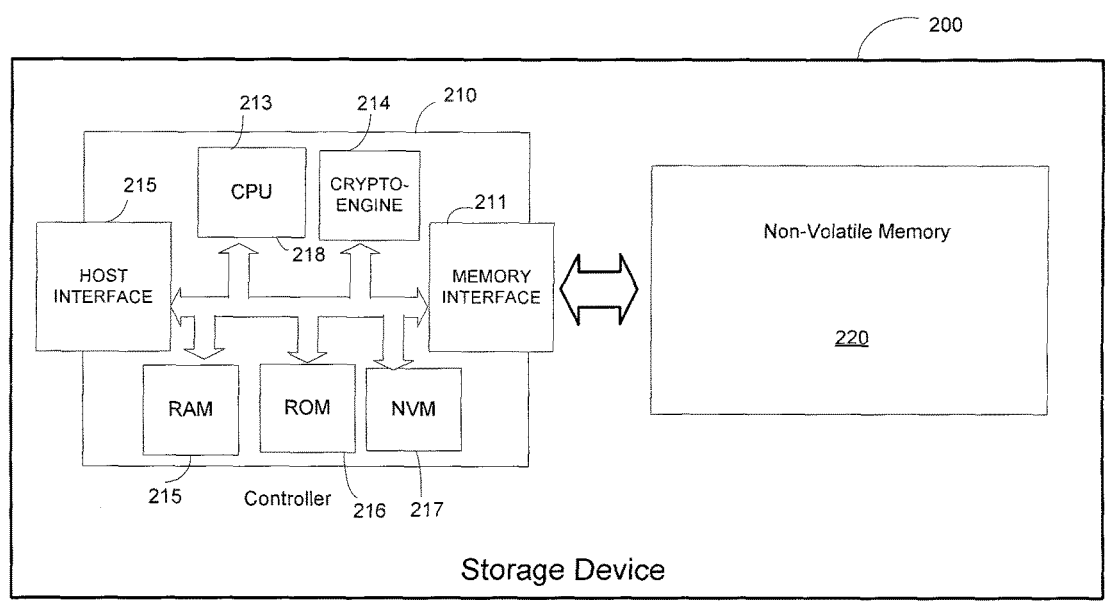
FIG. 2 is a block diagram of an exemplary storage device of an embodiment.

The non-volatile memory 120 can simply be a memory chip or can be part of a self-contained storage device with its own controller. An example of such a storage device 200 is shown in FIG. 2. As illustrated in FIG. 2, the storage device 200 comprises a controller 210 and non-volatile memory 220. The controller 210 comprises a memory interface 211 for interfacing with the non-volatile memory 220 and a host interface 212 for placing the storage device 200 in communication with other components of the computing device 100. As used herein, the phrase "in communication with" could mean directly in communication with or indirectly in communication with through one or more components, which may or may not be shown or described herein. For example, the computing device 100 and storage device 200 can each have mating physical connectors that allow the storage device 100 to be removably connected to the computing device 100.

The controller 210 also comprises a central processing unit (CPU) 213, an optional hardware crypto-engine 214 operative to provide encryption and/or decryption operations, read access memory (RAM) 215, read only memory (ROM) 216 which can store firmware for the basic operations of the storage device 100, and a non-volatile memory (NVM) 217 which can store a device-specific key used for encryption/decryption operations, when used. The controller 210 can be implemented in any suitable manner. For example, the controller 210 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example.

The storage device 200 can be embedded in or removably connected with the computing device 100. For example, the storage device 200 can take the form of an iNAND™ eSD/eMMC embedded flash drive by SanDisk Corporation or can take the form of a removable memory device, such as a Secure Digital (SD) memory card, a microSD memory card, a Compact Flash (CF) memory card, a universal serial bus (USB) device, or a solid-state drive (SSD).

Returning to FIG. 1, the non-volatile memory 120 can store computer-readable program code that is executed by the processor 110 to provide various functions of the computing device 100. For example, the non-volatile memory 120 can store computer-readable program code for one or more applications ("apps"), as well as code for an operating system kernel. When the processor 110 executes these sets of code, the processor 100 runs the software to enable their functionality.

Figure 3:
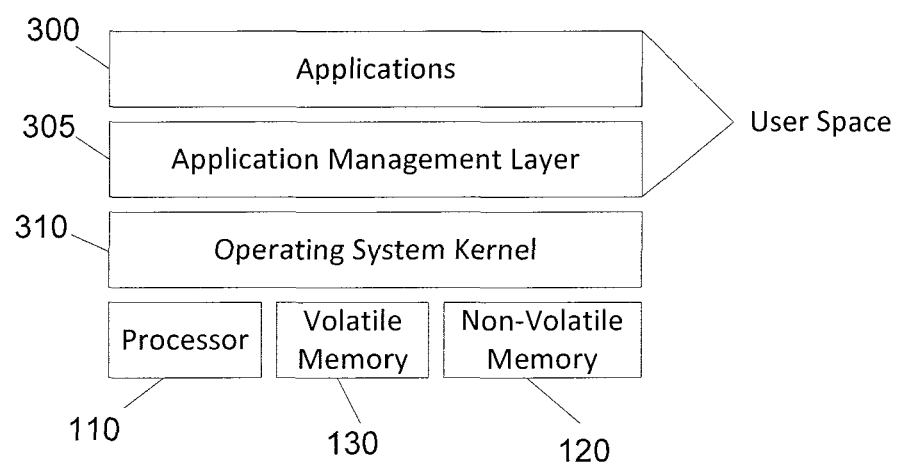
FIG. 3 is an illustration of the functional relationship between applications, an application management layer, and an operating system kernel of an embodiment.

As shown in FIG. 3, a typical model for the operation of the software in the computing device 100 partitions the "space" of the software into two main components: the user space (which contains applications 300 and an application management layer 305 (or "application manager")) and the operating system space (which contains the operating system kernel 310). In general, the operating system kernel 310 is the component of the operating system that serves as a bridge between the applications 300 and the application management layer 305 (both of which are running in the user space) and the processor 110 and non-volatile and volatile memories 120, 130 by managing the communication between these software and hardware components. The application management layer 305 is responsible for determining which of the applications 300 should reside in volatile memory 130, and the operating system kernel 310 is responsible for deciding which of the applications 300 should be allocated to the processor 110. The application management layer 305 requests a service from the operating system kernel 310 by issuing function calls, such as, for example, close, open, read, wait, and write calls.

In the user space, the relevant objects are applications (e.g., such as apps for making a phone call, taking a picture, opening a video, etc.), and each application translates into a process (or several processes) that need to run in order to support the application's functionality. Each process has a projection into the kernel space. From the operating system kernel's perspective, a process is an entity that requires resources: memory, time slots to run in, structures that describe the process, etc. The operating system kernel 310 is the process manager and allocates the memory resources and the time slots where the process can run. So, in some sense, the processes can be said to run in the operating system kernel 310; however, the operating system kernel 310 has no knowledge of the functionality of the processes. The operating system kernel 310 does not even know if a process is running in the background or foreground. From the operating system kernel's perspective, the process is defined by the resources it needs to support it.

In the user space, the application management layer 305 is aware of the functionality of each process, of the processes associated with each application 300, and of the priority of an application 300 and its associated processes. In order to support the operating system kernel 310 in its role of resource allocation to the processes running in the operating system kernel 310, the application management layer 305 in the user space can compute a priority parameter, sometimes known as adjustment, and reports this parameter to the operating system kernel 310. Typically, the adjustment parameter is added to the structure defining the process (i.e., the reflection of the process in the kernel space) and will be updated on a regular basis. For example, the adjustment parameter can be defined as a 16-level parameter where a low value indicates high priority and a high value indicates low priority. Whenever memory resources are insufficient for fulfilling a memory allocation request of a process (in the operating system kernel 310), the operating system kernel 310 may free some memory in the volatile memory 130, either by swapping (i.e., moving some data from the volatile memory 130 (e.g., RAM) into the non-volatile memory (e.g., main storage)) or by ending (or "killing") low-priority processes (as indicated by the adjustment parameter). The operating system kernel 310 can compute a first threshold function: A=F (free memory, required memory), where A is a number in the range of the adjustment parameter. Then, the operating system kernel 310 can kill any process with an adjustment greater than (or equal) to A in order to fulfill the requests from current processes.

The following embodiments can be implemented in any suitable manner in the computing device 100. For example, as discussed above, the processor 110 of the computing device 100 can execute an operating system kernel 310 as well as applications 300 and an application management layer 310 running in the user space. The operating system kernel 310 can be Linux or incompatible with Linux. Operating systems with a kernel incompatible with Linux include, but are not limited to, Windows operating systems (e.g., Windows 8 NT and Windows 8) and Apple operating systems (e.g., iOS and Mac-OSx). Also, the various acts discussed below can be performed by sending function calls from the application management layer 305 to the operating system kernel 310.

Further, in some embodiments, a storage device (e.g., eMMC or UFS devices) can be designed with a special partition of the same chip, or a special chip, that is designed for high performance and endurance. This may assist in the adoption of swap operations in mobile computing devices. That is, many current mobile operating systems do not enable swap due to the concern of the endurance of embedded storage devices. Specifically, the concern is that if swap is utilized as a DRAM extension, it will result in increased traffic and cause severe stress to the embedded device, possibly damaging the device and rendering the whole system non-operable. Also, traditionally, eMMC devices all have limited endurance and are not designed for swapping. Using a partition or special chip designed for high performance and endurance can help address this issue. The following section provides more information on the swapping process.

General Overview of Swapping Operations

As mentioned above, to launch an application, the processor 110 in the computing device 100 loads computer-readable program code for the application from the non-volatile memory 120 into the volatile memory 130 and then executes the code. Executing the code can create dynamic application data, which is also stored in the volatile memory 130. As used herein, "dynamic application data" (or "application data") refers to data that is dynamically allocated by the application for internal use and maintains the state information of the application, such that, if lost, will require the application to be reloaded. Examples of such application data include, but are not limited to, temporary data that is buffered, data allocated in an internal stack or cache, or video/graphic data that is buffered for rendering purposes, data from specific or shared libraries, and data generated from external data (e.g., from a network).

Figure 4C:
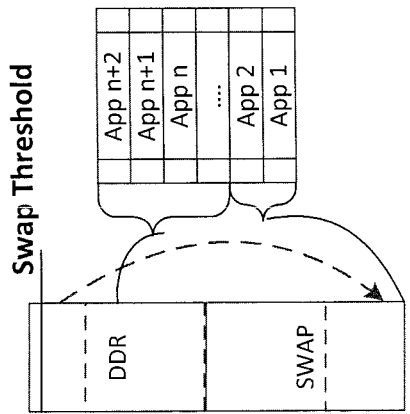
FIGS. 4A-4C are diagrams that illustrate a swapping mechanism of an embodiment.
Figure 4B:
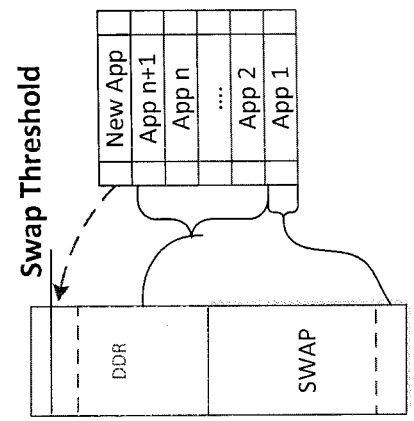
Figure 4A:
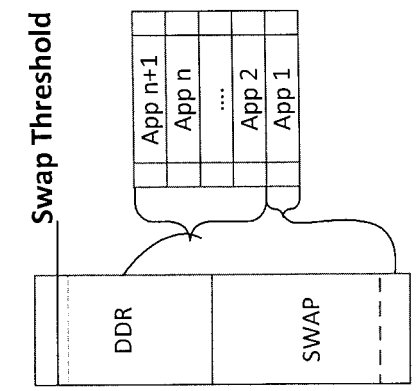

Because a computing device typically has a relatively-small amount of volatile memory as compared to non-volatile memory, there is a limit as to the number of applications that can be loaded into volatile memory. That is, while computing devices are generally fitted with sufficient volatile memory (e.g., DRAM) for handling the memory requirements during the initial system boot process, additional memory may be needed when applications are loaded on an as-needed basis by the operating system or explicitly by the user. As such, as some point, the computing device 100 may need to end (or "kill") one or more applications currently running in the volatile memory 130 in order to provide volatile memory resources for a new application. However, to re-start a killed application, the launching process is repeated, and this may cause an undesirable delay for the user. To reduce this delay, instead of killing the application, the processor 110 can use the non-volatile memory 120 as a memory extension to the storage space in the volatile memory 130, and move (or "swap out") the application data from the volatile memory 130 to the non-volatile memory 120. (As the code for the application itself is already stored in the non-volatile memory 120, the code residing in the volatile memory 130 can simply be deleted instead of moved to the non-volatile memory 120). In this way, when the user wants to re-launch the application, after the application code is executed, the processor 110 simply needs to move the "swapped-out" application data from the non-volatile memory 120 to the volatile memory 130, instead of generating the application data again from scratch, as the swapped-out application data contains all the state information needed for the application to continue. This reduces the delay the user experiences when re-launching the application. FIGS. 4A-4C illustrate this swap process in more detail.

In FIGS. 4A-4C, the volatile memory 130 is diagrammatically shown as dynamic DRAM (DDR) memory, and the non-volatile memory 130 is diagrammatically shown as SWAP memory. As noted above, the SWAP memory can be a partition in the non-volatile memory 120 or can be a separate memory device. These figures show a "swap threshold," which is the minimum amount of available space that the volatile memory 130 is desired to have for caching and other operations. The operating system of the computing device 100 maintains a dynamic pool of available memory for use by the kernel and a separate pool for application usage. A swapping operation occurs when the available space in the volatile memory 130 has dropped below the threshold level.

In FIG. 4A, the volatile memory (DDR) 130 stores the application code and application data for Apps 2 through n+1. App 1 has already been swapped out, so the application data for App 1 is stored in the non-volatile memory (SWAP) 120. During a normal operating mode, the computing device 100 will be in a steady state, where the system RAM (DDR) utilization will be below a predetermined threshold level (e.g., for system caching). As long as the computing device 100 does not exceed this threshold, the computing device will maintain its steady state. If there is any action that causes the DDR usage to exceed the threshold, such as a New App launch (see FIG. 4B), the DDR usage will trigger a swap action. As shown in FIG. 4C, when this occurs, the processor 110 moves the application data for App 2 from the DDR to the SWAP memory (and deletes the application code for App 2 from the DDR) to create room in the DDR for the New App (now called App n+2). Thus, the New App launch causes the computing device 100 to rebalance the available memory by effecting a swap action from the DDR to the SWAP area, thereby freeing-up system RAM for future use.

It should be noted that the processor 110 can use any suitable technique for determining which application to swap out. For example, in the memory swapping mechanism that can be used with Linux systems in Android phones, specific portions of application data in the volatile memory are moved to the non-volatile memory using a least-recently-used (LRU) mechanism to determine which pieces (e.g., in increments of 4 KB) can be moved to the non-volatile memory. This method provides a scheme for moving out old, cold data that has not and will likely not be accessed for some time. In Linux, a swap area consists of 4 KB slots, where there is one slot for each memory page. The first slot is the swap area header. When an anonymous page (i.e., a page not in the file system) is swapped out, it will be written to the swap area. When the process needs this page later, the page will be retrieved from the swap area. If the page is brought-in for write, the corresponding slot will be marked as invalid and can be re-used. However, if the page is brought-in for read, it will have two copies: one in DRAM and the other in the swap area. If the page is modified later, the copy in the swap area will be invalidated. If the page is swapped out with no modifications, the copy in the DRAM will be invalidated.

In operation, Linux will file a contiguous 256 page free space call a swap_file_cluster for swap out. Once the space is used up, Linux will find the next cluster sequentially and search from the beginning of the swap area to minimize the seek time. If no such cluster can be found, the processor will find the first available slots for swap out. After reboot, the swap area will start empty. The swap cluster will be allocated from the previous shutdown to improve wear leveling. Therefore, at the beginning, the swap out trace is likely sequential. The free slots will be fragmented eventually, which can cause performance issues since the swap out becomes a random write.

After an extended period of use, the whole swap space can be used up, and "wrap around" can occur, where previously-written pages that are now marked "invalid" can be re-written. Invalid pages can be pages that were swapped to the non-volatile memory and read back to the DRAM and are no longer needed. Also, depending on the usage pattern and workload, some pages may never be read back to the DRAM. As a result, the swap space can be severely fragmented and full of "invalid" data.

Embodiments Relating to Pre-Loading Applications

While the swapping mechanism discussed above reduces the delay in re-launching an application, the user will still experience a delay when launching the application for the first time. To address this issue, operating systems in some modern-day computing devices are designed to automatically pre-load a set of applications during the boot-up process of the computing device, when the user is normally expecting there to be some delay. As used here, a "pre-loaded" application refers to an application that was automatically launched without the user specifically, manually requesting the application to be launched at the time the user wants to actually use the application (e.g., without the user touching the icon for the application on the display screen). (However, as mentioned below, a user can designate in advance which applications should be pre-loaded.) That way, when the computing device is booted up, there will be a core set of applications that are ready to go without any delay experienced by the user. However, the number of application that can be pre-loaded into the DRAM is limited by the size of the DRAM. Also, when additional applications are to be launched after power-up, those additional applications will also need to be loaded into the DRAM. As some point, the DRAM will become saturated (no/low free memory), and applications in the DRAM will need to be killed before any further applications can be loaded or, in some extreme cases, loaded and killed. Once an application is killed, the processor will need to restart the initial code launch sequence the next time the user chooses to launch it, which requires time and possibly incurs additional network charges.

This embodiment takes advantage of the swap space in the non-volatile memory 120 in order to pre-load more application that just those that will fit in the volatile memory 130. That is, instead of just pre-loading the core set of applications into the volatile memory 130, the processor 110 in this embodiment loads additional applications. If the loading of one or more of these additional applications causes the amount of available space in volatile memory 130 to drop below the threshold level, the application data of one or more applications can be moved from the volatile memory 130 to the non-volatile memory 120. So, there will be pre-loaded applications both in the volatile memory 130 and the non-volatile memory 120). If the user chooses an application that is pre-loaded in the volatile memory 130, the application will respond with no/minimal delay. (The user may or may not know whether an application is pre-loaded and, if it is, which memory it resides in.) However, if the user chooses an application that is pre-loaded in the non-volatile memory 130, the application code and the application data will need to be loaded into the volatile memory 130. While this will take some time, it will take less time than launching the application from scratch. Thus, this embodiment can be used to allow more applications to be loaded into a combination of volatile and non-volatile memory. This allows for faster application launch as loading program data sequentially from the non-volatile memory is faster than launching the application from the scratch.

In general, the processor 110 in this embodiment pre-loads a plurality of applications in the volatile memory 130 until it is determined that available space in the volatile memory 130 has dropped below a threshold level. The processor 110 pre-loads an application by copying application code for the application from the non-volatile memory 130 into the volatile memory 120, executing the application code from the volatile memory 130, wherein executing the application code creates application data, and storing the application data in the volatile memory 130. When the processor 110 determines that the available space in the volatile memory 130 has dropped below the threshold level, the processor 110 moves the application data for at least one application from the volatile memory 130 to the non-volatile memory 120. The processor 110 can also delete the application code from the volatile memory 130 for the application(s) whose application data was moved from the volatile memory 130 to the non-volatile memory 120.

This embodiment can be implemented in any suitable way. For example, applications can be pre-loaded during boot time of the computing device 100. Several actions occur during the boot-up process, such as jumping to a reset vector (i.e., a default address for the first line of code that needs to be executed to power-up the computing device 100), initiating the boot strap sequence, executing the boot loader to initialize the basic system hardware, initiating the operating system kernel load process where additional hardware and peripherals are brought up and the core system drivers are loaded, initializing the file system (e.g., activating the swap partition and sending a TRIM command to clean blocks), and loading system drivers. As noted above, in more-advanced operating systems, a set of applications can be pre-loaded into the volatile memory 130 during boot-up in anticipation of user interaction, and, in this embodiment, additional applications are pre-loaded for user-experience enhancement.

Figure 5:
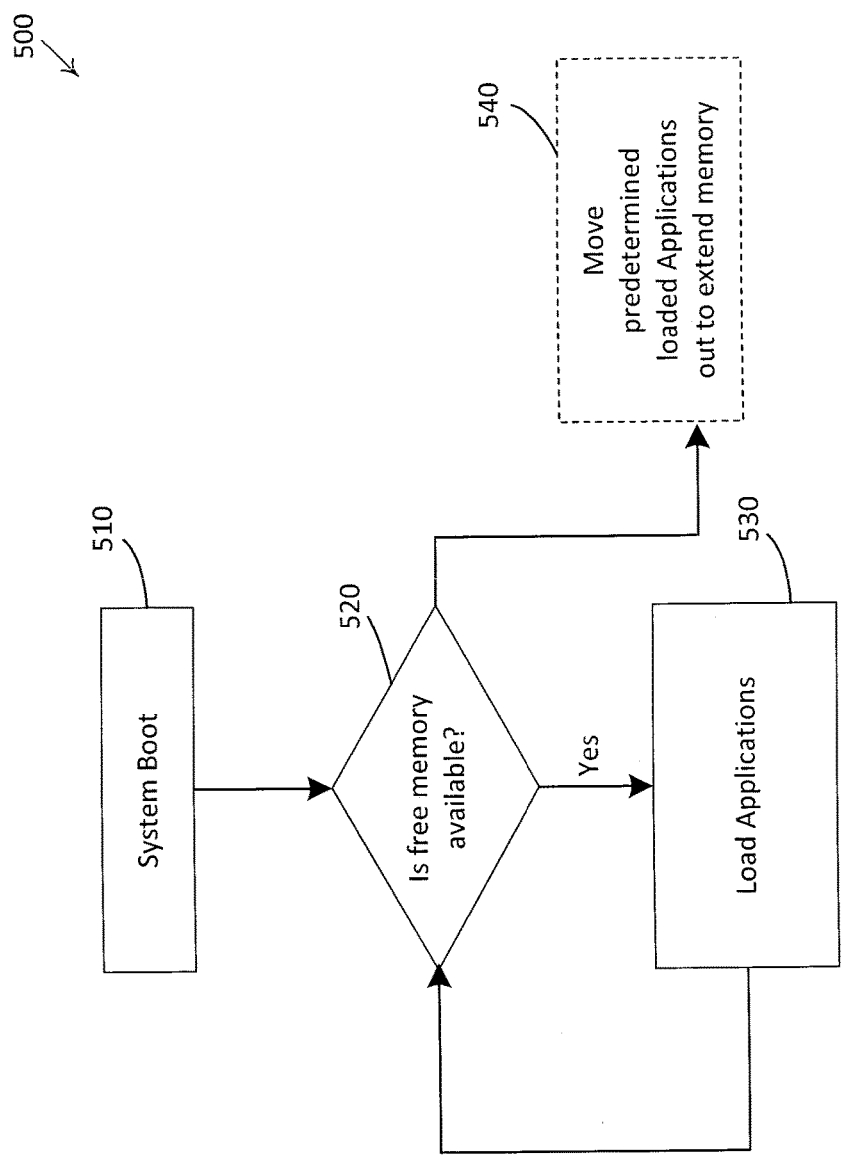
FIG. 5 is a flowchart of a method of an embodiment for pre-loading an application.
Figure 6C:
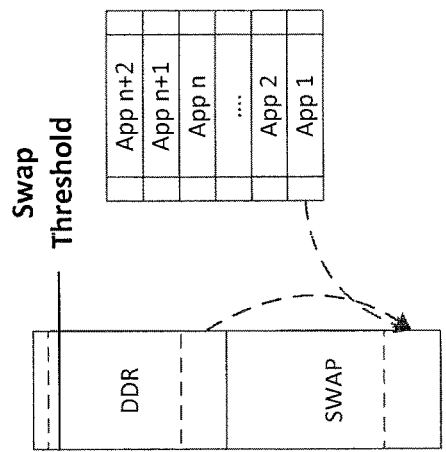
FIGS. 6A-6C are diagrams that illustrate a swapping mechanism of an embodiment.
Figure 6B:
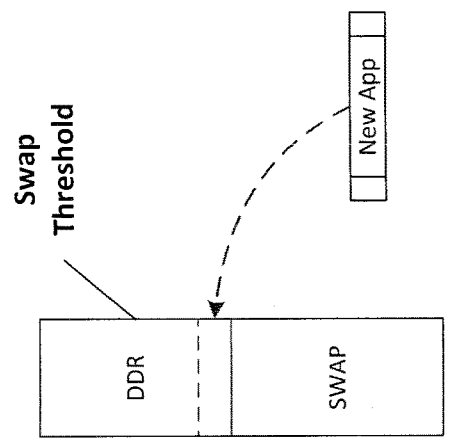
Figure 6A:
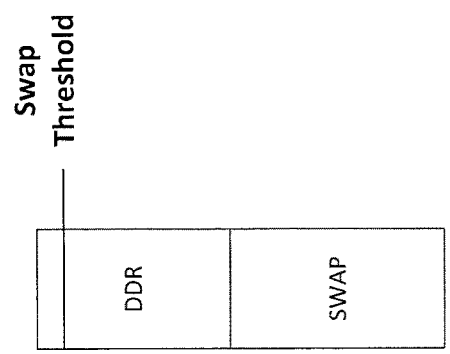

Returning to the drawings, FIG. 5 is a flowchart 400 of an embodiment for pre-loading applications during boot-up of the computing device 100 and will be illustrated in conjunction with FIG. 6A-6C. As shown in FIG. 5, the processor 110 first starts the system boot process (act 510). As shown in FIG. 6A, during the start of the boot process, both the volatile memory (DDR) 130 and the SWAP portion of the non-volatile memory 120 are empty. During the boot process, the processor 110 determines if there is free memory available in the volatile memory 130 (i.e., whether or not the available space in the volatile memory 130 has dropped below a threshold) (act 520). If there is free memory available in the volatile memory 130, the processor 110 pre-loads an application in the volatile memory 130 (act 530) (see FIG. 6B). The processor 110 continues this process of pre-loading applications into the volatile memory 130 until the swap threshold is met, and the processor 110 determines that there is no more free memory available. At that point, the processor 110 moves the application data from one or more of the pre-loaded applications to the non-volatile memory 120 (and can delete the application code for those applications from the volatile memory 130) (act 540). This is illustrated in FIG. 6C, with App 1 being swapped out of the DDR and into the SWAP area. The other pre-loaded applications (App 2 through App n+1) remain in the DDR.

The determination of which application(s) to swap out can be made in any suitable way. For example, the computing device 100 can store a list of application(s) (predetermined or user-created) whose application data should be moved from the volatile memory 130 to the non-volatile memory 120 when it is determined that the available space in the volatile memory 130 has dropped below the threshold level. As another example, the computing device 100 can stores multiple lists (again, predetermined or user-created), such as a list of primary applications and a list of secondary applications, where the primary applications are pre-loaded before the secondary applications are pre-loaded (more than two lists can be used). This example is illustrated in the flow chart 700 of FIG. 7.

Figure 7:
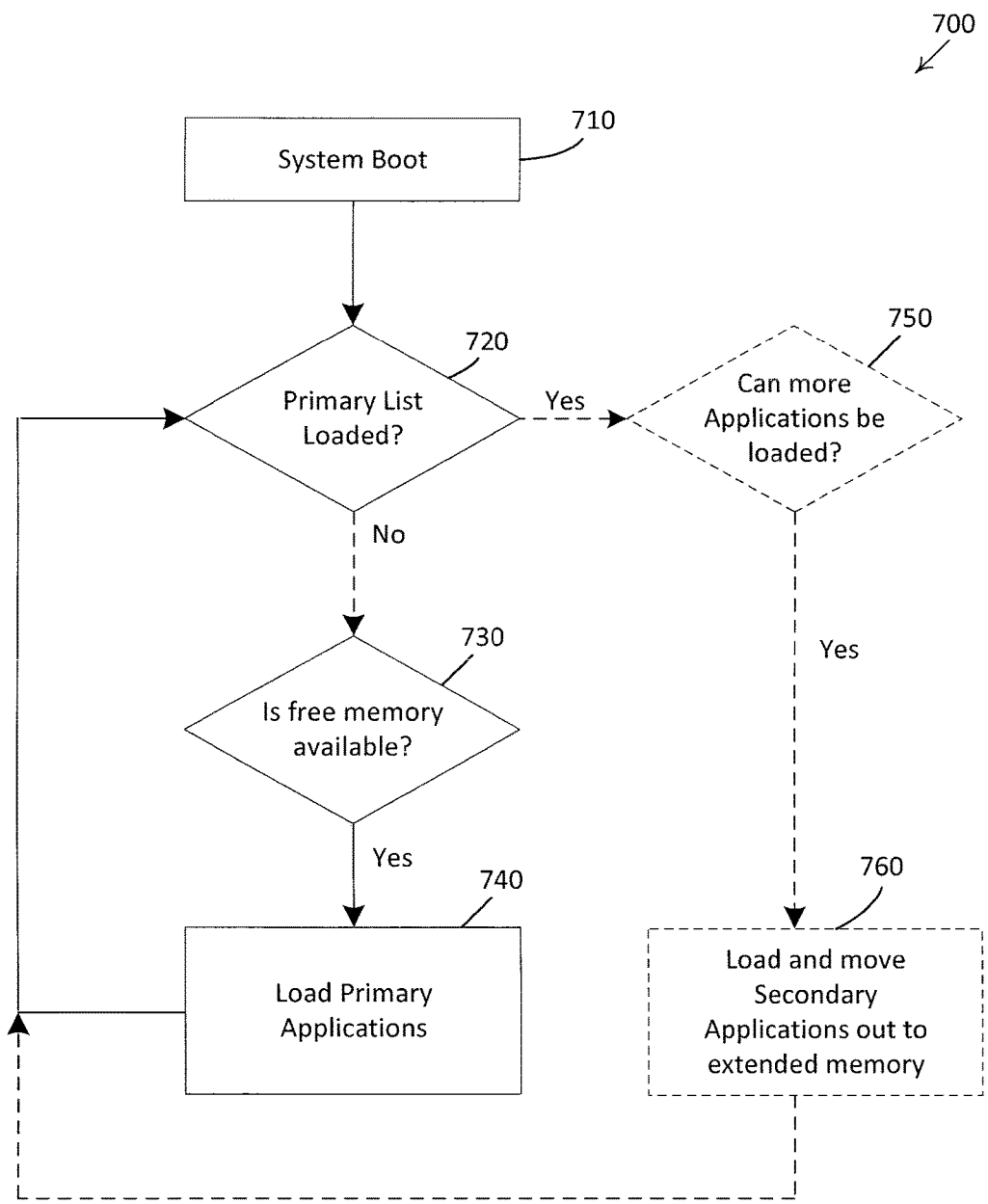
FIG. 7 is a flowchart of a method of an embodiment for pre-loading an application.

As shown in FIG. 7, during system boot of the computing device (act 710), the processor loads the applications from the primary list (act 720) and determines if there is sufficient free space in the volatile memory 130 (act 730). If there is, the processor 110 pre-loads applications from the primary list as long as there is available space in the volatile memory 130. After the primary list of applications has been pre-loaded, the processor 110 determines whether there is enough room in the volatile memory 130 for more applications to be pre-loaded (act 750). If there is, the processor 110 pre-loads the applications from the second list into the volatile memory 130 and, if the volatile memory 130 is running out of room, moves them out to the non-volatile memory 120 as needed (act 760). With this embodiment, the processor 110 pre-loads whatever "core" applications are listed in the first list (e.g., applications specified by a mobile computing device manufacturer or user) and them pre-loads other applications in the volatile memory 130 (if there is space) or in the non-volatile memory 130.

Figure 8:
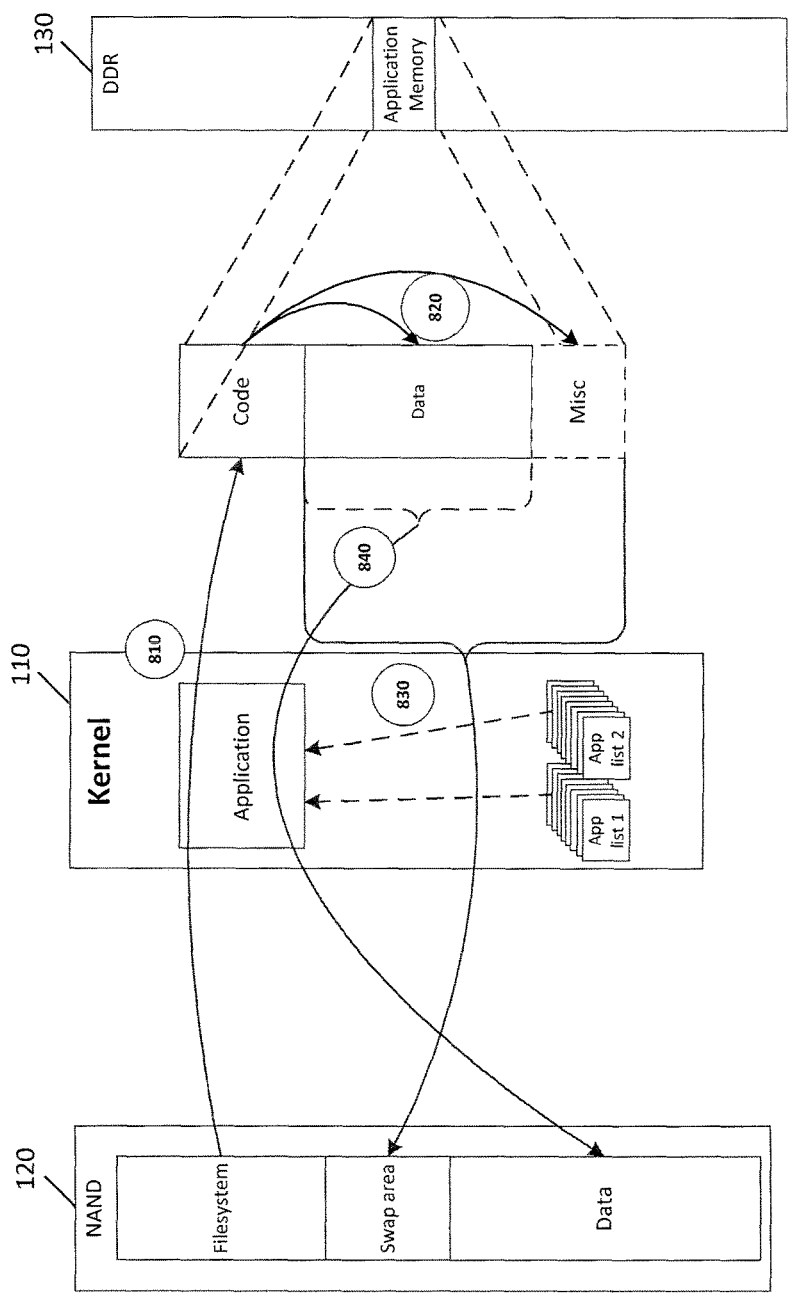
FIG. 8 is a diagram that illustrates a swapping mechanism of an embodiment.

FIG. 8 illustrates this swapping process in more detail. As shown in FIG. 8, when an application is launched, the code for the application is loaded from the file system area of the non-volatile memory 120 into the DDR area 130 (act 810). As mentioned above, there are several steps to an application launch process. Memory from the free memory pool (DRAM) is dynamically allocated on an as-needed basis depending on the application load. During the initial application launch, the code is loaded into DRAM. Depending on the specific libraries referenced, some shared libraries are loaded into the shared memory. Data is dynamically allocated by the application for internal use ("application data"). This could include buffers for temporary data storage, allocation for internal stack or cache, or even video/graphic buffer for rendering purposes. This memory typically maintains the state information of the application and if lost (or forcefully 'killed') will cause the application to reload. That is, the application data stores the state of the application, so the application can later be restored to the state it was in when the application data was swapped out to the non-volatile memory.

In some embodiments, the application data, but not the application code, will be swapped out to the non-volatile memory 130, as the application code is static (not dynamic) and will not change throughout the life of the application. As such, the application code can be re-loaded from the file system section of the non-volatile memory 130. The application data, however, is generated after code execution (CPU overhead) and, in some cases, from data that needs to be downloaded through a network connection. This combination creates an overhead on the application launch time.

Returning to FIG. 8, the processor 110 executes the code, generates application data, and allocates memory for the application data (act 820). Additional memory may be used for shared libraries or graphics buffering. The swap processes move the application data from the DDR area 130 to the swap space non-volatile memory 120 (act 830). If the application is terminated (willingly or forcefully), some data will be preserved in the data partition (act 840). As noted above, this process continues with as many of those applications being pre-loaded into the volatile memory 130 as possible, and the others pre-loaded into the volatile memory 130 and then swapped out to the non-volatile memory 120.

Figure 9:
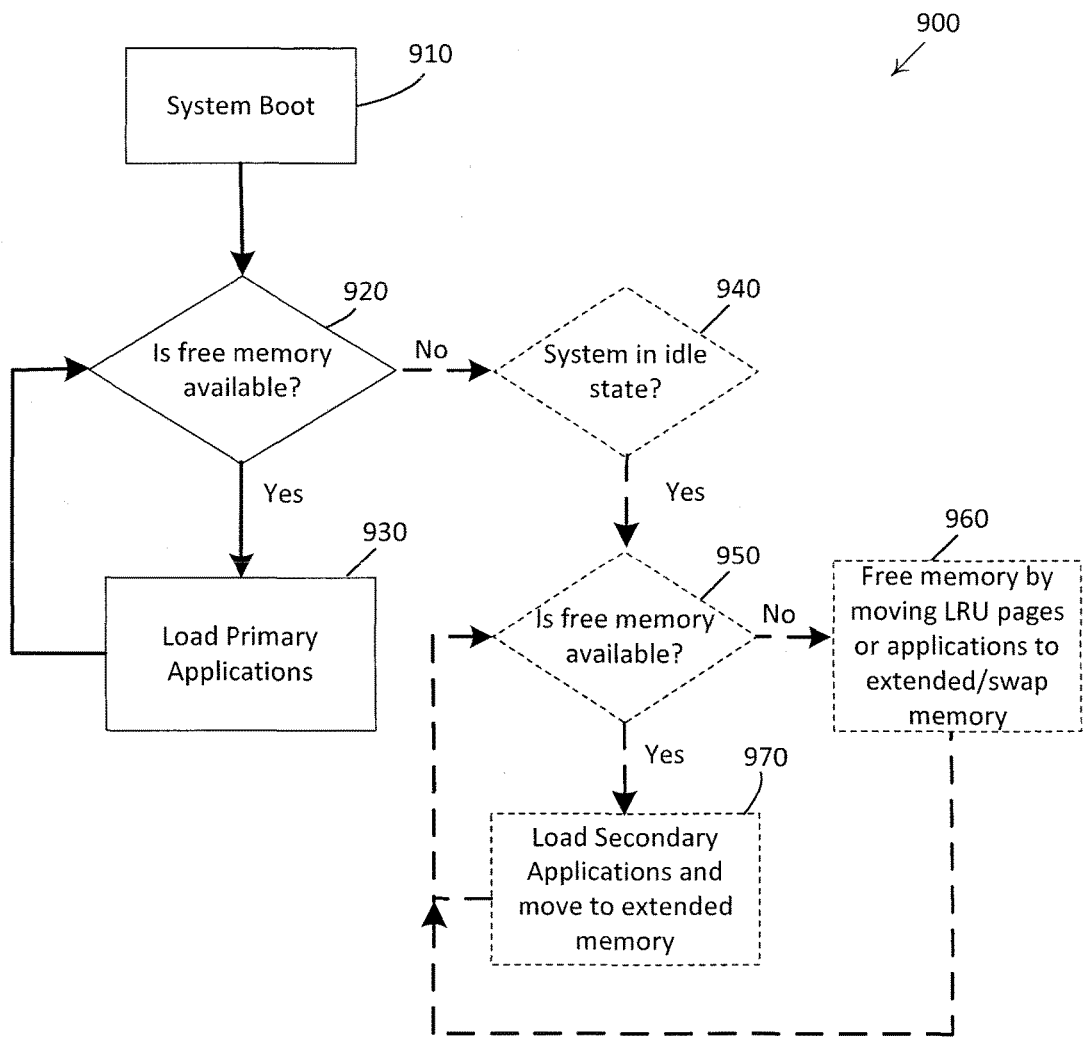
FIG. 9 is a flowchart of a method of an embodiment for pre-loading an application.

In the examples shown in FIGS. 7-8, the primary and secondary applications are pre-loaded during booting of the computing device 100. In another embodiment, shown in the flow chart 900 in FIG. 9, the primary applications are pre-loaded during booting of the computing device 100, but the secondary applications are pre-loaded during idle times after the computing device 100 has been booted. Idle time can be determined in any suitable way, including, but not limited to, based on the number of threads active over time, the amount of processor 110 activity, and whether the computing device 100 is in standby mode. As shown in FIG. 9, during system boot (act 910), the applications listed in the primary list are pre-loaded, if there is available memory (acts 920 and 930). Then, after the computing device 100 has booted up, the processor 110 determines when it is in the idle state (act 940). When the processor 110 is in the idle state, the processor 110 will pre-load applications listed in the secondary list, if there is available memory (acts 950, 960). If there isn't available memory, the processor 110 swaps out applications into the swap space (act 960).

There are many alternatives that can be used with these embodiments. For example, instead of using application lists, system-defined parameters can be used to specify which applications to pre-load and which specific services to defer to prevent excessive boot time. Also, a best-fit algorithm can be used to determine the most-efficient methodology to pre-load the applications, and most-recently-used application and user-preference algorithms can be used as pre-loading factors. Further, different techniques can be used to determine the application preload sequence, determine when to preload applications (e.g. to avoid preloading when the computing device 100 is in its critical loading process, as this can slow down boot up), dynamically manage free, cached, and swap memory, and automatically terminate specific applications during the time of critical memory allocation.

Embodiments Relating to Bandwidth Control of a Swap Operation

As mentioned above, operating systems of modern computing devices utilize different swapping algorithms to extend system memory to varying degrees of success. Some of the algorithms include the use of temporal-based swapping (e.g., least-recently-used page-based swapping) and contextual/spatial-based swapping (i.e., application/chunk-based swapping). In computing devices that are bandwidth-bound, there are issues dealing with user experience, specifically when large (in size or number) input/output (I/O) operations saturate the bus between the processor and the memory, leaving users with a less-than-optimal experience. Accordingly, one of the biggest issues in using the swap mechanism is the added latency to the system. Due to the intrinsic design of NAND architecture, a need exists for a more-optimal method to balance latency with throughput. NAND performance is bottlenecked by the I/O operations when doing small-sized random commands; while, on the other hand, sequential commands greatly improve the throughput. User experience is proportional to the performance of the read command—the longer a read command takes to complete, the longer the delay felt by the user. Large commands increase the time-to-completion for each command. Without the ability to prioritize the commands, it is very likely that a large sequential command or a series of commands will delay other commands long enough to make the system irresponsive. With the introduction of a swap operation in NAND-based storage devices, there is a need to load balance the available throughput of the device against this latency. This is directly felt by the user when an action is taken (e.g., with an application launch). This premise also hold true for other swap-based operations. The amount of memory swapped out is directly proportional to the memory demand, and, in times of severe memory shortage, large chunks of memory will be swapped out over a short period of time.

Figure 10:
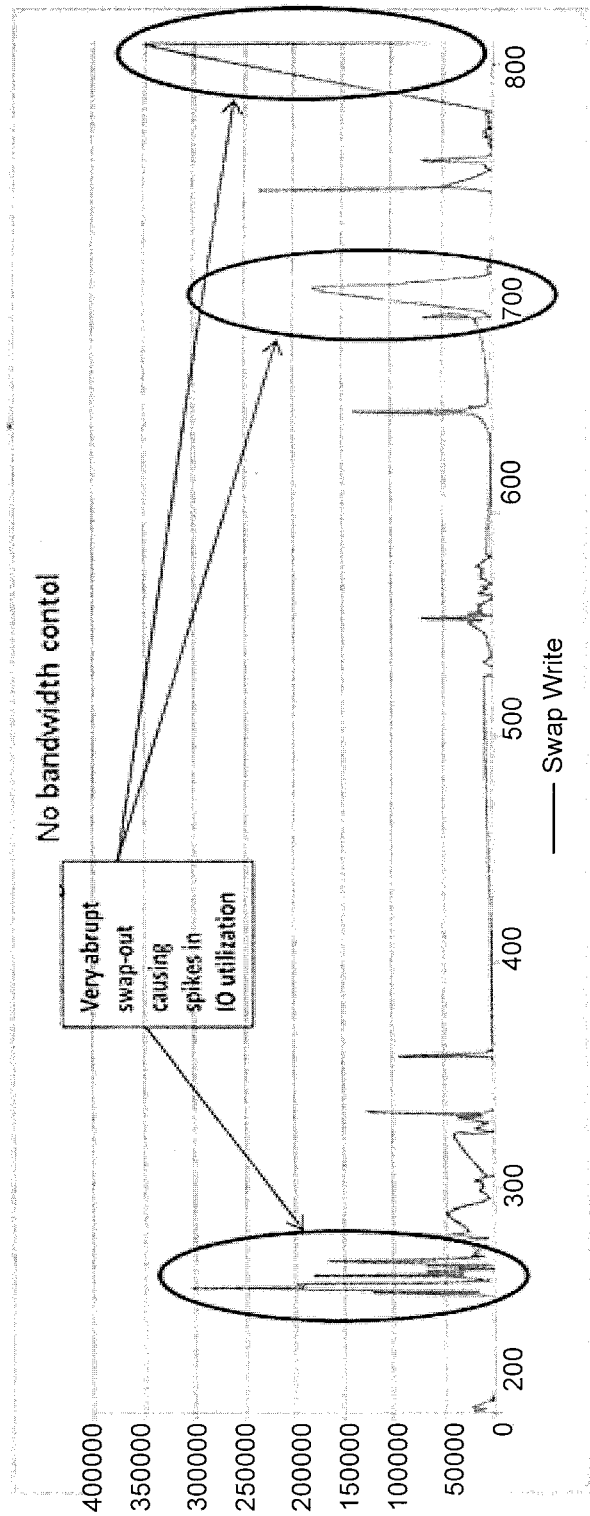
FIG. 10 is a graph of swap operations of an embodiment without bandwidth control.
Figure 11:
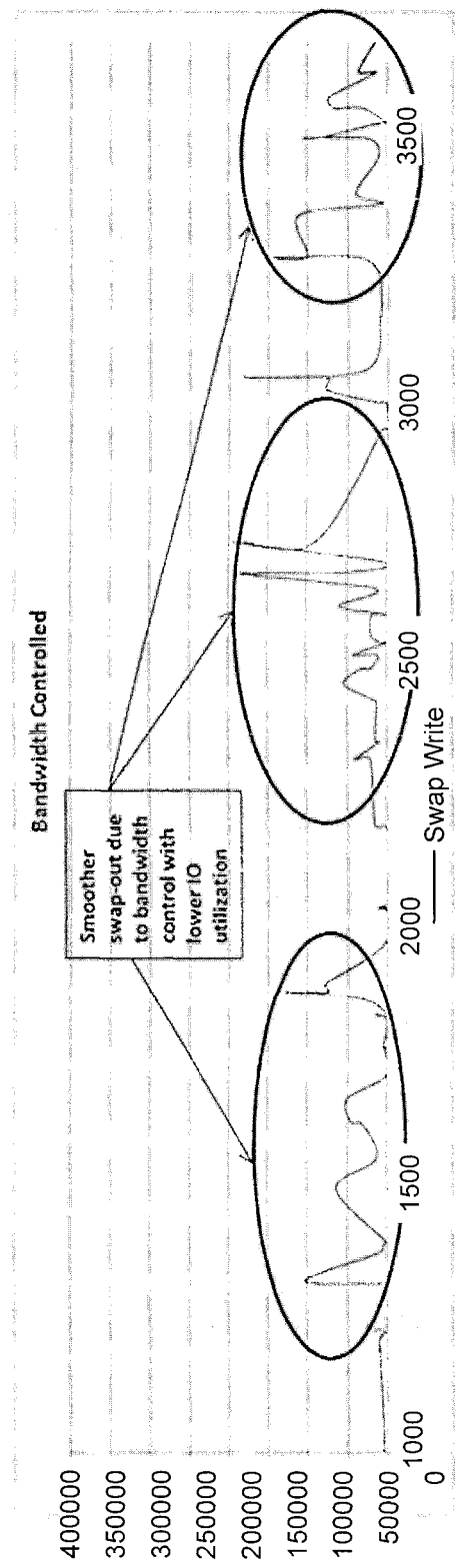
FIG. 11 is a graph of swap operations of an embodiment with bandwidth control.

FIG. 10 is a graph that illustrates this problem by showing an example of the cumulative effect of swap and I/O operations. As shown in this graph, there are three peaks where very abrupt swap-outs cause spikes in the I/O utilization. The following embodiment seeks to address the issue through the use of bandwidth rate control. As shown in the graph of FIG. 11, by using bandwidth control to lower the I/O utilization, the three peaks in FIG. 10 are smoothed out.

To provide for this smoothed-out operation, in one embodiment, the processor 110 determines a bandwidth at which at least some of the application data for at least one application should be moved from the volatile memory 130 to the non-volatile memory 120 during a swap operation, and then moves the data according to the determined bandwidth. There are several techniques that the processor 110 can use to determine the appropriate bandwidth. For example, the processor 110 can allow a user to set the bandwidth control through one or more predefined system parameters. In another example, advanced heuristics and/or NAND parameters can be used to define an optimal threshold for swap over a predetermined period of time. Both of these techniques seek to lessen the effects of swap on the I/O throughput and command latency, which adversely affect the user experience.

Figure 12:
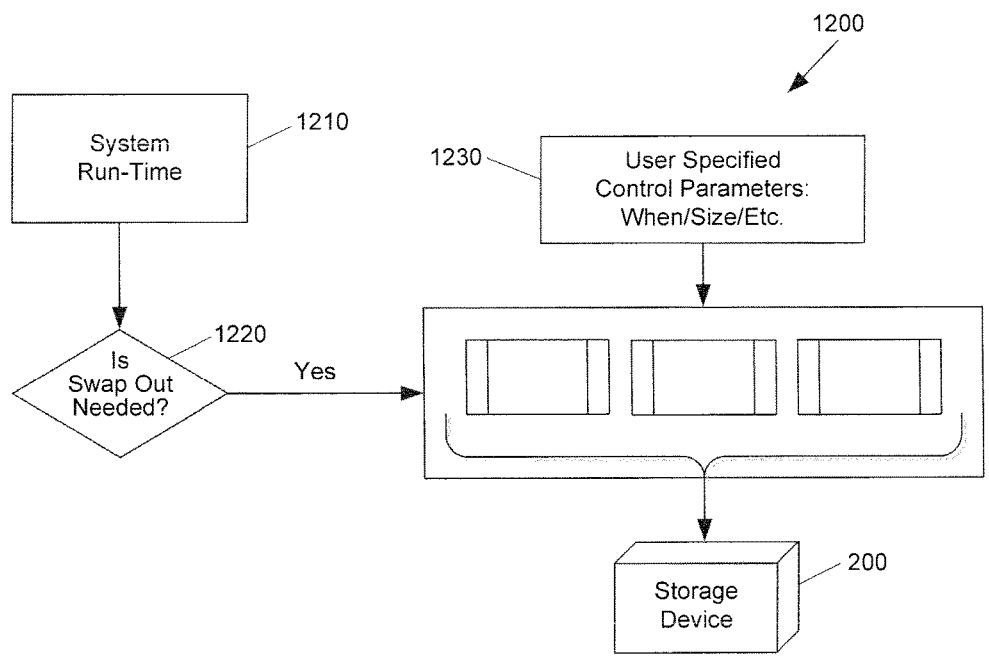
FIG. 12 is a flow chart of a method of an embodiment for bandwidth control of a swap operation.

Returning to the drawings, the diagram 1200 in FIG. 12 illustrates a user-control technique in which bandwidth in a swap operation is regulated by a parameterized control technique. As shown in FIG. 12, during system run-time (act 1210), the processor 110 determines if a swap out is needed (act 1220). If it is, the processor 110 takes a set of user-specified control parameters into account when swapping out data into the non-volatile memory 120 of the storage device 200. In this way, the processor 110 relies on system memory requirements to decide when to perform a swap operation but relies upon user-specified parameters to determine the swap-out characteristics. The set of user-specified control parameters can include one or more of the following parameters: swap size (the amount of data to swap over a period of time (or per frequency parameter), which allows the system to better "smooth out" the I/O traffic and reduce the bursty transactions that lead to latency issues), sampling/ swap frequency (the frequency of occurrence (e.g., number of times per sec.)), transfer size (this defines the low-level transfer size, where the bigger the size, the more efficient the transfer because of less overhead (but this may possibly increases latency due to blocking on specific types of I/O schedulers)), swap threshold (the threshold when swap-out would occur), and kill threshold (the threshold when an application should be killed instead of swapped-out). Of course, these are just examples, and other types of parameters can be used.

Figure 13:
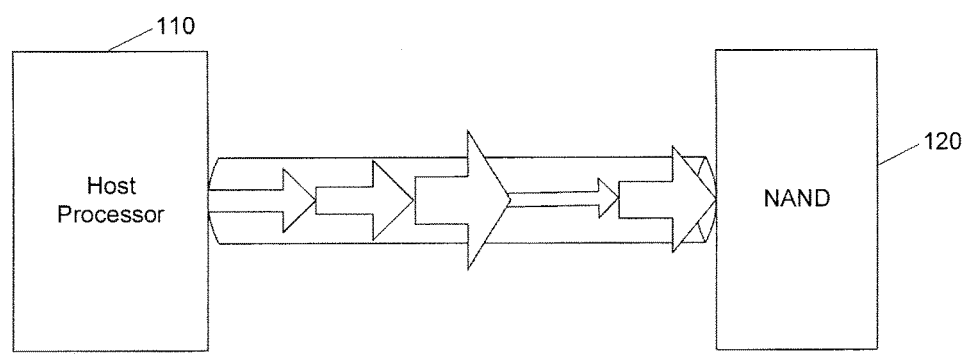
FIG. 13 is an illustration of bandwidth control of a swap operation of an embodiment.

FIG. 13 is an illustration of this parameterized control mechanism. In this illustration, the swap size is represented by the width of the pipe, as it defines how much data can go through the pipe over a certain period of time. The sampling/ swap frequency is represented by the number of arrows, as it indicates how many times (e.g., per second) the processor 110 will examine the system behavior and force a swap-out, if needed. The transfer size refers to the width of each individual arrow.

As mentioned above, another technique that can be used for bandwidth control employs advanced heuristics and/or NAND parameters to define an optimal threshold for swap over a predetermined period of time. This technique utilizes feedback from the NAND device to the host that is fed through an algorithm to automatically determine the best settings to use. Manual control of any/all parameters can be allowed to bypass limitations, and additional parameters can be used as a percentage of the maximum throughput of the device. This allows balancing the throughput/latency on a fine scale irrespective of the underlying device. This technique will be discussed in conjunction with FIGS. 14 and 15.

Figure 14:
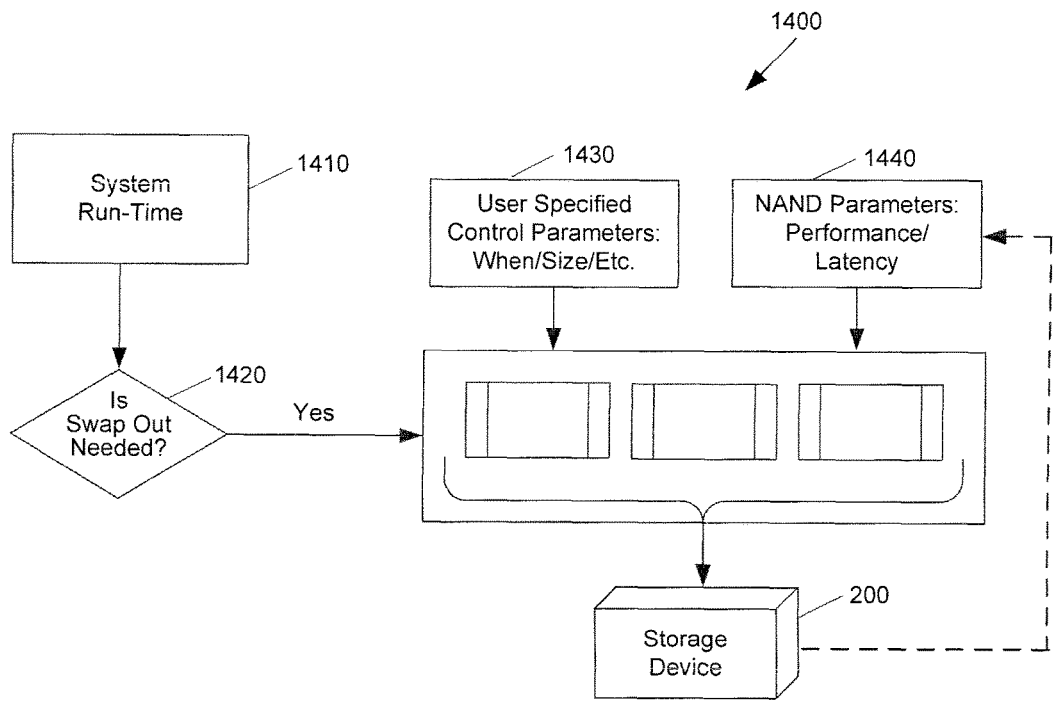
FIG. 14 is an illustration of a method of an embodiment for bandwidth control of a swap operation.
Figure 15:
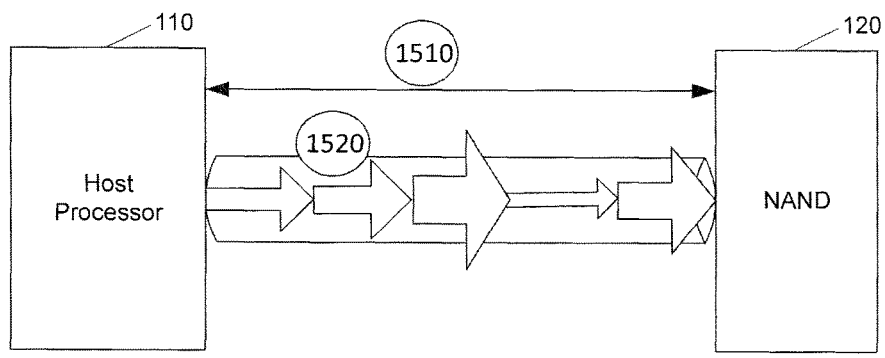
FIG. 15 is an illustration of bandwidth control of a swap operation of an embodiment.

As shown in the diagram 1400 in FIG. 14, during system run-time (act 1410), the processor 110 determines if a swap out is needed (act 1420). If it is, the processor 110 takes into account not only the set of user-specified control parameters, as above (act 1420), but also takes into account NAND parameters, such as, for example, performance/latency (act 1440). That is, this embodiment uses advanced heuristics and/or NAND parameters to define an optimal threshold for swap over a predetermined period of time. So, the processor 110 can use the characteristics of the non-volatile memory 120 to automatically adjust the user-specified control parameters to fit the characteristics of the non-volatile memory 120. This is shown diagrammatically in FIG. 15, where arrow 1510 shows the communication of the NAND parameters from the NAND (the non-volatile memory 120) to the processor 1510, and arrows 1520 represent how the user-defined parameters are automatically adjusted for a "best fit" scenario and determine the correct bandwidth control to use. This allows efficient, sequential transfer size to maximize swap out while at the same time using advanced bandwidth shaping algorithms to minimize latency for good user experience.

There are several alternatives that can be used with these embodiments. For example, in one alternative, the processor 110 can monitor for all I/O utilization and dynamically vary the swap bandwidth. This can include the steps of measuring I/O traffic load in the system, limiting memory swap out, predicting I/O traffic (based on predetermined or calculated past data), delaying/deferring a swap transfer until a later time, and dynamic chunk size setting based on load.

Embodiments Relating to Encryption of Data in Swap Area

One problem observed by many nonvolatile storage systems is the security of the data stored within. Given the data is persistent across power-down cycles, any sensitive information or data, be it sensitive application data or licensed content, stored in the device is susceptible to theft. One method to combat this theft is through the use of digital rights management (DRM) and/or encryption; however, this type of protection is currently done on a per-application basis and not during memory management operations, such as a swap operation. As explained above, in most modern operating systems, virtual memory subsystems make use of a swap operation to "extend" the available system memory. Depending on the algorithm used, a swap mechanism could be used to store the least utilized memory pages. In scenarios where application security is based on key exchange or privately-generated keys, the keys are stored in volatile memory. In times of severe memory pressure, it is conceivable that the key and/or data could be swapped out onto non-volatile storage, thereby leaving this sensitive key and/ or data exposed, as there exists a possibility that the storage device can be removed, and the data extracted with malicious intent. Additionally, it is possible to overwrite the data at any location in the non-volatile memory with malicious code. The underlying technology may afford some level of security through translation table look ups, but it is not 100% fool proof.

Figure 16:
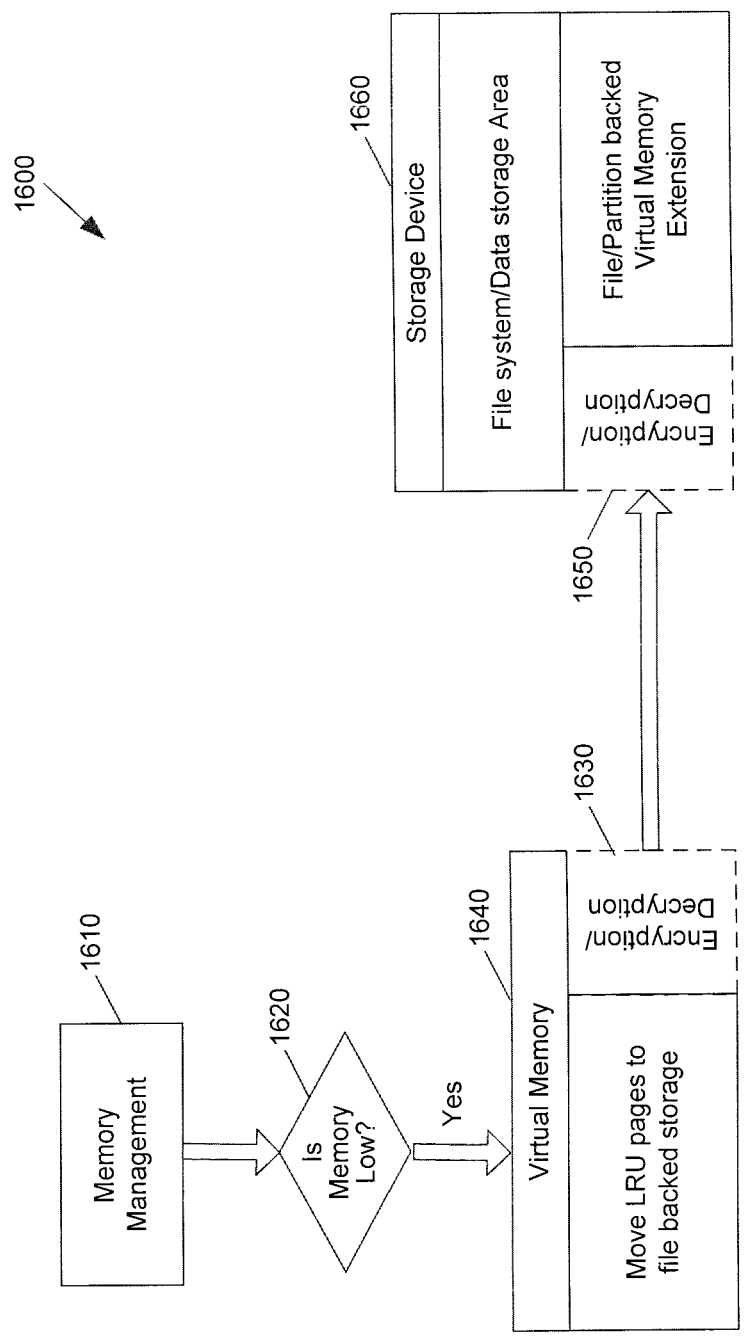
FIG. 16 is an illustration of a method of an embodiment for encrypting data to be stored in a swap area in a non-volatile memory.

To address these issues, in this embodiment, data is encrypted before it is stored in the non-volatile memory extension area (the swap area). By providing security features in the virtual memory swapping mechanism (in either or both hardware and software), sensitive data will be protected during the power down state. Securing data through encryption will also allow the system to detect intrusion and determine whether the data has been compromised. This can be done by integrating encryption capabilities in the virtual memory or in the entire region in the memory device. FIG. 16 is a flow chart 1600 that illustrates the general principles of this embodiment. As shown in FIG. 16, during a memory management operation (act 1610), the processor 110 determines if the memory is low (act 1620), and, if it is, moves data from the volatile memory 1640 to the non-volatile memory 1660 to perform a swap operation. As shown in FIG. 16, this embodiment includes an encryption/ decryption module 1630, 1650 in either or both of the host or storage devices. So, with this embodiment, the data can be encrypted as it is moved in to the swap out area and decrypted it as it is being moved out of the swap out area. This provides maximum endurance level with a minimum amount (if any) of manual customization of product parameters.

As mentioned above, the encryption/decryption functionality can be part of host or the memory device feature set, or a combination of both. This way, this embodiment can be adaptive to different usage models. That is, the goal of ensuring the security of the swapped-out data by setting up a secure path for the data can be attained by embedding a security channel (through hardware or software support) either on the host or on the storage device. Depending on the security requirements, it is also possible to enable security on both the host and the storage device. The alternatives will now be discussed in conjunction with FIGS. 17-25.

Figure 17:
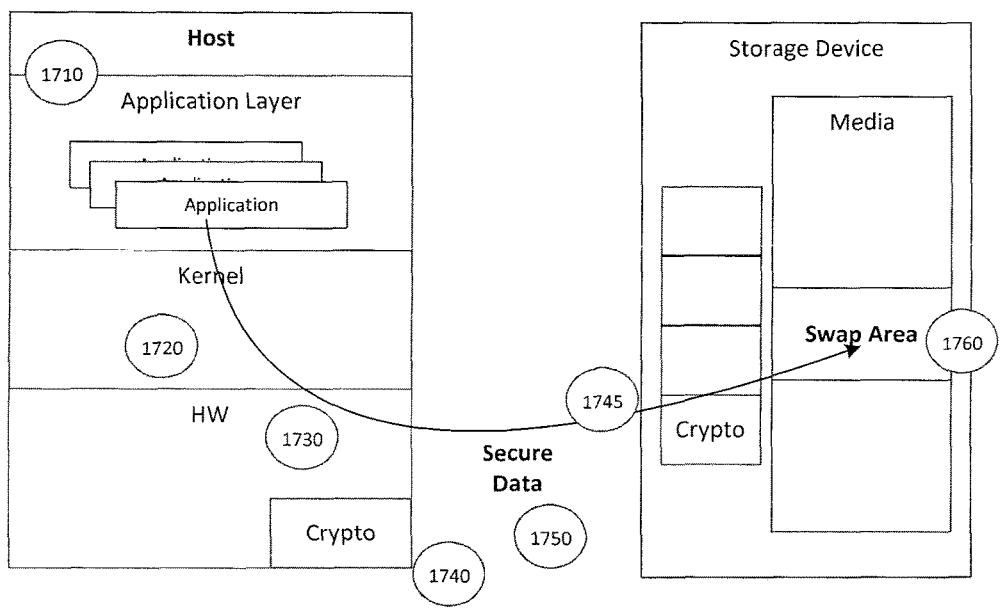
FIG. 17 is an illustration of an encryption process of an embodiment.
Figure 18:
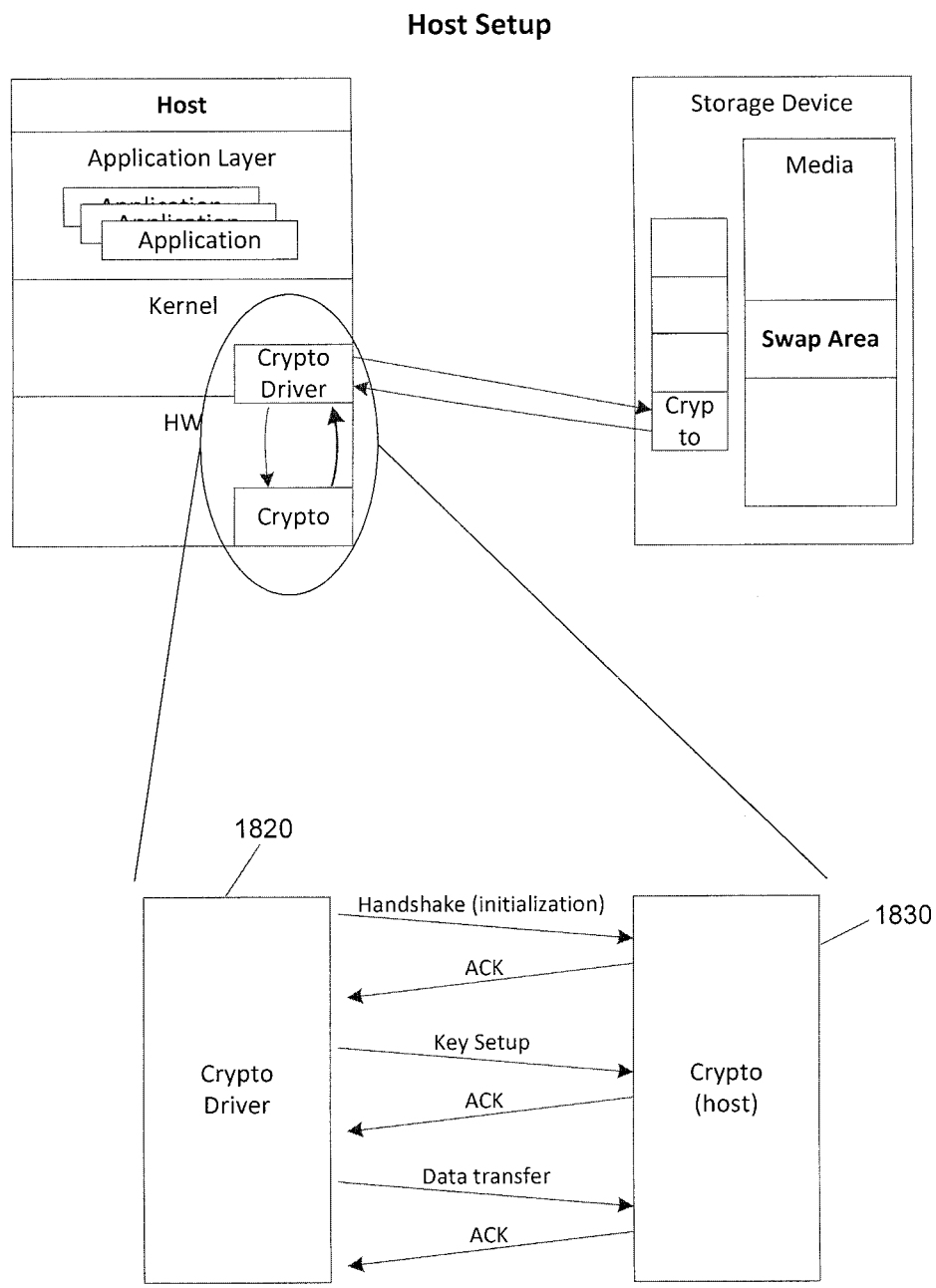
FIG. 18 is an illustration of a host set-up process of an embodiment.

FIG. 17 illustrates an encryption process in which both the host and the storage device contain a cryptographic module for encryption/decryption. The encryption process is initiated when the host detects a swap out (to the swap area) is needed to free up system memory (act 1710). The host will select an application or memory to swap out depending on the algorithm used (e.g., least recently used) (act 1720). Once the memory to be swapped out has been determined, the kernel will initialize the hardware to prepare for the encryption process (act 1730). As shown in FIG. 18, this can involve handshaking between the crypto-driver 1820 in the kernel and the hardware crypto-engine 1820. Depending on the requirements, handshaking between the host and device crypto engines 1820, 1930 (see FIG. 19) may be needed (act 1740). The encryption process may also require a token or a series of tokens (or rolling token) to achieve a high level of security. Once everything has been set-up correctly, the data transfer can take place to the designated area in the swap space (acts 1750 and 1760).

Figure 20:
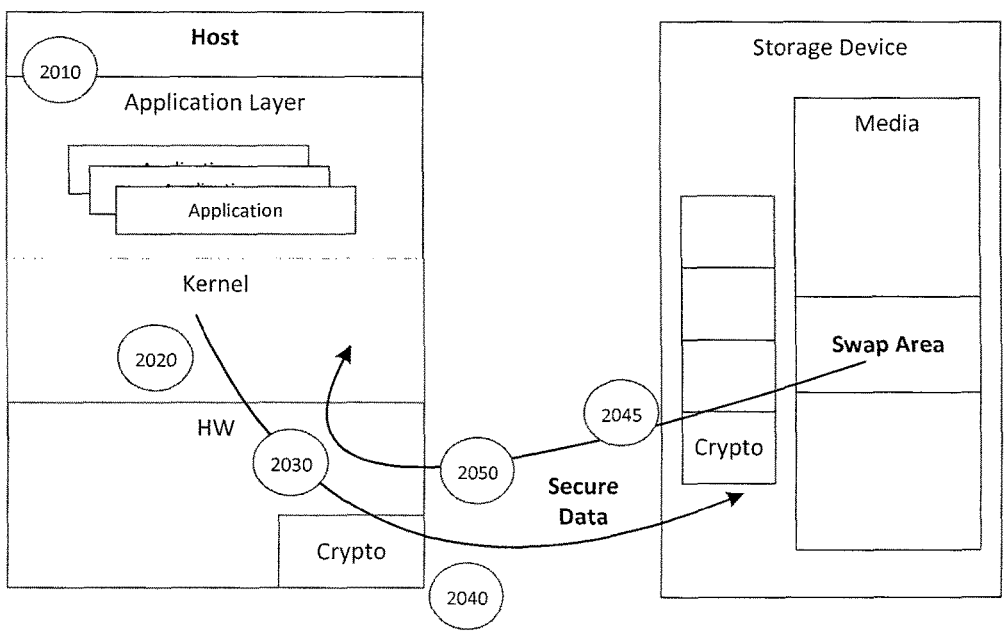
FIG. 20 is an illustration of a decryption process of an embodiment.
Figure 21:
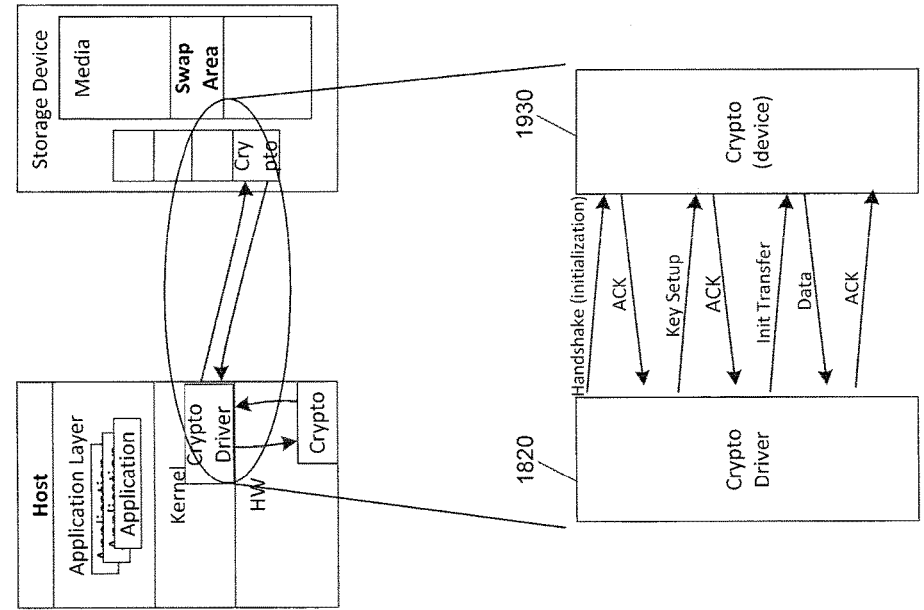
FIG. 21 is an illustration of a memory device set-up process of an embodiment for decryption.
Figure 19:
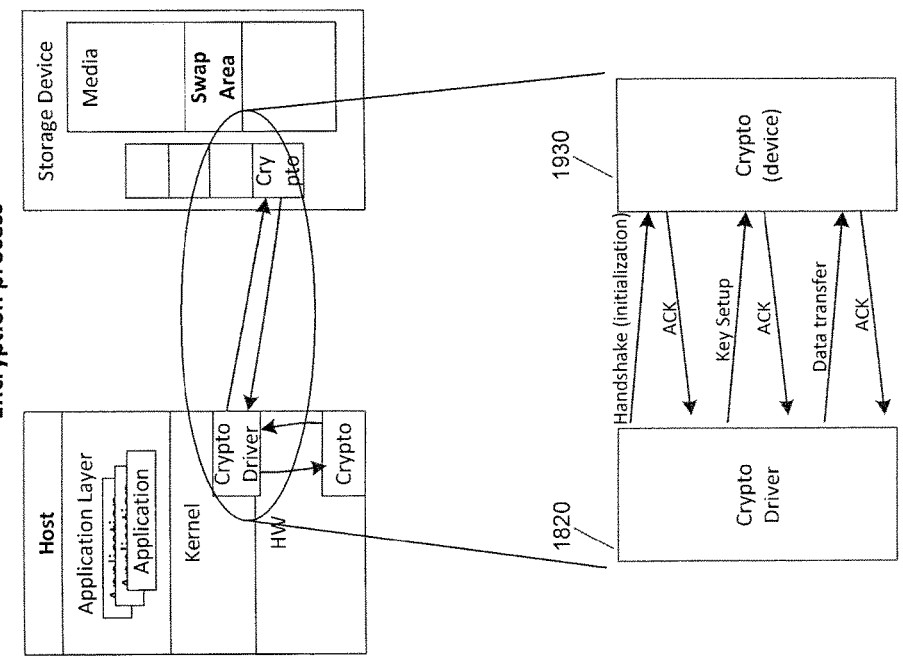
FIG. 19 is an illustration of a memory device set-up process of an embodiment for encryption.

FIG. 20 illustrates the decryption process that is initiated when the host detects that required memory has been swapped out. First, the processor 110 determines that a swap-in is needed to access data stored in the swap area (act 2010). The processor 110 then selects the memory to swap in (act 2020). The host hardware is then initialized to prepare for the data transfer and decryption, and the crypto-engines on both the host and the storage devices are set-up to handshake to determine the necessary information for secure data transfer and for decryption/validation (acts 2030 and 2040). As shown in FIG. 21, this can include handshaking between the crypto-driver 1820 in the kernel and the crypto-engine 1930 in the memory device. Then, the data is ready to be transferred (act 2050).

Figure 24:
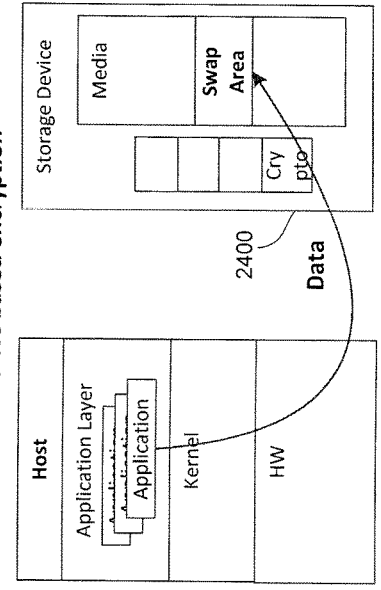
FIG. 24 is an illustration of a storage-device-based encryption process of an embodiment.
Figure 25:
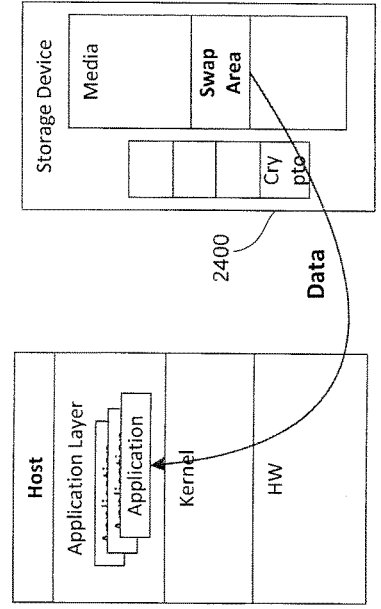
FIG. 25 is an illustration of a storage-device-based decryption process of an embodiment.
Figure 22:
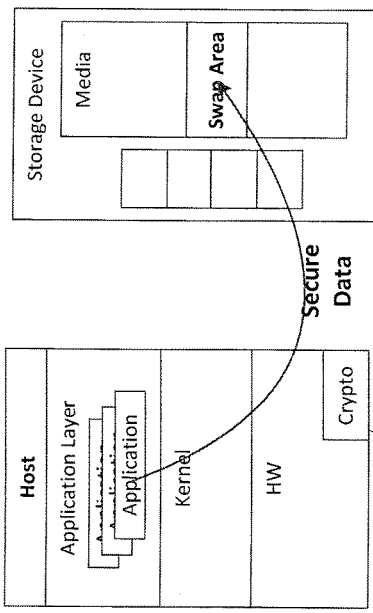
FIG. 22 is an illustration of a host-based encryption process of an embodiment.
Figure 23:
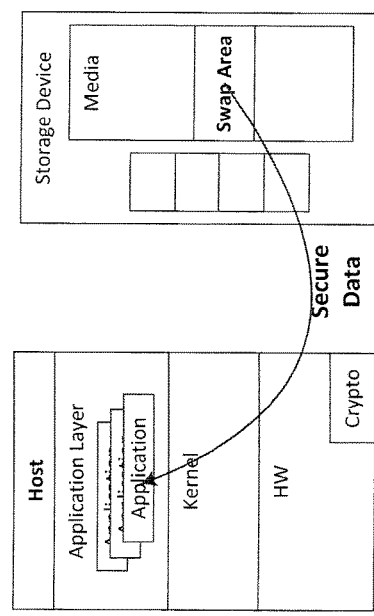
FIG. 23 is an illustration of a host-based decryption process of an embodiment.

There are several alternatives that can be used with these embodiments. For example, while the above embodiments have crypto-engines both in the host and storage device, there can be a crypto-engine 2200 just in the host device (FIGS. 22 and 23) or crypto-engine 2300 just in the storage device (FIGS. 24 and 25).

Embodiments Relating to Fast Clean-Up of Swap Area

When the host computing device does a power cycle (e.g., when a PC or smartphone is turned off), all the data in the volatile memory is lost, and the system will start afresh. However, the swap space in the non-volatile memory maintains the previously swapped-out data, even though none of the data is valid or relevant. In order for the swap space of the non-volatile memory to become serviceable again, the swap space in the non-volatile memory should be cleaned up and erased to restore the original time 0 state (i.e., so there is no swapped-out data stored in the non-volatile memory). As the erase speed of Flash is quite slow (e.g., 5-20 msec), erasing all of the thousands of the blocks of the swap area (e.g., a few GB) can take seconds, during which time the swap space is not useable. Even if swap is not needed right after system boot up, the swap space still needs to be cleaned up to make it useable, and this will take system time and energy.

This embodiment addresses this problem by simultaneously erasing all the blocks in the swap space (e.g., at boot up) to efficiently clean and reset the whole swap space. In this embodiment, the processor 110 takes the fact that the computing device is booting up as a signal that all the data in the swap space from previous sessions is no longer valid and needs to be clean up. Specifically, during boot up, the processor 110 resets the reset vector and initiates the boot strap sequence, and executes the boot loader to initialize the basic system hardware. The processor 110 also initiates the operating system kernel load process where the more-advanced system hardware is brought up and the core system drivers are loaded. The swapping mechanism is initiated as part of the system boot process. The initiation process includes cleaning the swap partition by erasing the content of the partition, either through a pseudo erase which only modifies the mapping table or actual overwrite of the data for security purposes. As NAND internally remaps the logical address, a special command is needed to force an actual erase of the used NAND blocks. The command can be a TRIM or DISCARD command from the operating system. The swap partition can use the command, in conjunction with the type of partition, to determine how best to erase the partition. This could be done as a single command to the entire partition or as a command that defines a list of blocks to erase.

At the NAND flash level, there can exist specific commands that will allow control over erase of the entire device. This provides a facility to support features such as secure erase or fast format but does not allow for the flexibility to allow partial erase on a partition level. Traditional support relies on serializing (or in limited circumstances, relies on serializing parallel support across dies/channels) the erase commands resulting in poor performance. This embodiment supports multi-block or partition erase through support at the NAND flash level that will allow parallel block erase. This support can be provided through a special NAND command, which is referred to here as Multi-Block Erase. The introduction of this feature allows for fast partition erase at the system level. In previous designs, the NAND controller performs a pseudo erase (clearing the table entries associated with the erased region) to speed up the erase process. With this methodology, there are additional delays introduced in that a new block needs to be erased before it can be used. With the introduction of Multi-Block Erase, the system now can introduce true fast erase of the series of blocks request by the system. The storage device can provide support for this Multi-Block Erase command where a list of block addresses can be sent into the NAND die to determine what blocks are to be erased. By iterating through this list of to-be-erased blocks, the memory device can simultaneously erase the needed blocks, thereby reducing the overhead of erasing each block independently. Any suitable syntax can be used for this command, such as: <MBE CMD> <ROW ADDR (plane & chip)> <DATA>, where data represents the block addresses to be erased. By issuing a multi-block erase command that lists all the invalid blocks of the swap partition, the storage device can erase them all in a single command. This will restore the swap space to an "all-erased" state, making it ready for the next swap, without the need to trigger garbage collection. In other words, this provides a total clean slate and restart.

Figure 26:
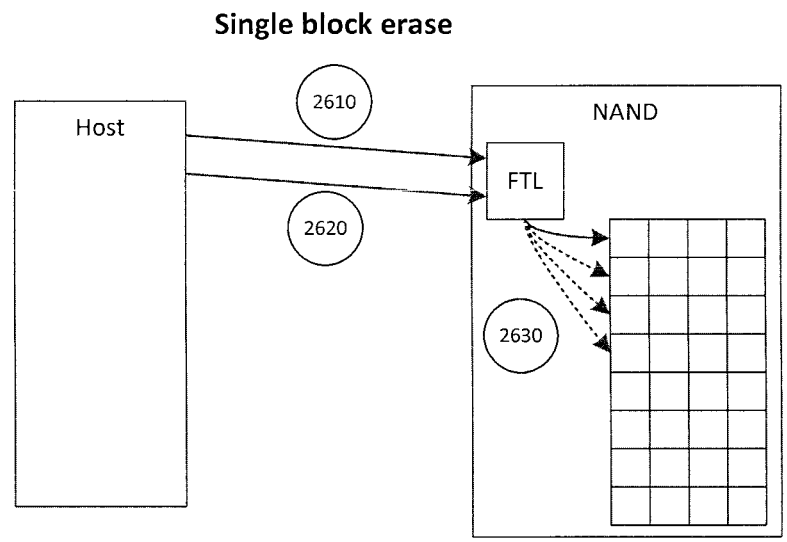
FIG. 26 is an illustration of a single-block erase process of an embodiment.
Figure 27:
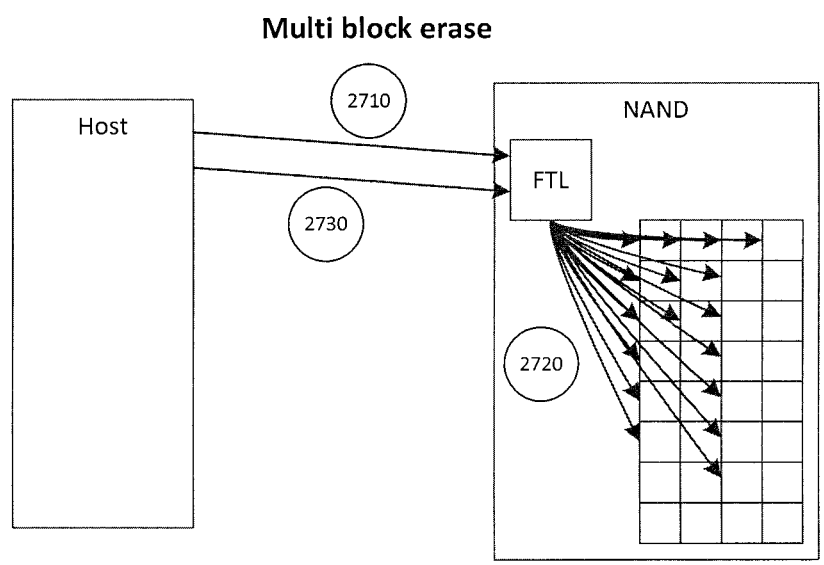
FIG. 27 is an illustration of a multi-block erase process of an embodiment.

FIGS. 26 and 27 will be used to illustrate different methods that can be used to erase the swap area in the non-volatile memory. FIG. 26 illustrates the single block erase method. In this method, the host controller 110 sends a trim/discard/erase command to the memory device notifying it of the region of blocks to erase (act 2610). The host controller 110 updates the flash translation layer (FTL) in the storage device controller with the erased blocks. Depending on the FTL design, the memory device may do a background erase or hold the blocks until needed. The host controller 110 then sends the write commands to the memory (act 2620). The blocks are used (and are erased prior to use) as needed, and there may be some background erase operations to avoid erase overhead (act 2630). This method may prove to be less efficient if a large number of blocks need to be erased quickly or if a (fast) secure erase is needed, as in the case of swap.

To address this, the multi-block erase process of FIG. 27 can be used. Here, the host processor 110 sends a trim/discard/erase command to the NAND notifying it of the region of blocks to erase (act 2710), and the memory device controller issues a multi-block erase command with a list of blocks to be erased. Using the provided list of blocks, the storage device controller will erase all the blocks simultaneously in approximately the same amount of time it takes to erase a single block (act 2720). After the blocks have been erased, the host processor 110 can send write commands (act 2730).

Exemplary Memory Technologies

As mentioned above, any type of memory technology can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for encrypting data stored in a swap area, the method comprising:
    performing the following in a computing device having a volatile memory and a non-volatile memory:
        loading an application in the volatile memory, wherein the application is loaded in the volatile memory by:
            copying application code for the application from the non-volatile memory into the volatile memory;
            executing the application code from the volatile memory, wherein application data is created after the application code is executed; and
            storing the application data in the volatile memory;
        moving the application data for the application from the volatile memory to the non-volatile memory during a swap operation and deleting the application code from the volatile memory for the application, wherein the application data is encrypted before it is stored in the non-volatile memory;
        receiving a request for the application; and
        in response to receiving the request, moving the application data for the application from the non-volatile memory to the volatile memory instead of recreating the application data from scratch wherein the application data maintains state information of the application.

2. The method of claim 1, wherein the non-volatile memory is part of a storage module, and wherein the application data is encrypted by an encryption module in the computing device.

3. The method of claim 1, wherein the non-volatile memory is part of a storage module, and wherein the application data is encrypted by an encryption module in the storage module.

4. The method of claim 1, wherein the non-volatile memory is part of a storage module, and wherein the application data is encrypted by an encryption module in the computing device and by an encryption module in the storage module.

5. The method of claim 1, wherein the non-volatile memory is part of a storage module, and wherein the storage module is embedded in the computing device.

6. The method of claim 1, wherein the non-volatile memory is part of a storage module, and wherein the storage module is removably connected to the computing device.

7. The method of claim 1, wherein the computing device is a mobile device.

8. The method of claim 1, wherein the non-volatile memory has a three-dimensional configuration.

9. A computing device comprising:
    a volatile memory;
    a non-volatile memory; and
    a processor in communication with the volatile and non-volatile memory, wherein the processor is configured to:
        load an application in the volatile memory, wherein the application is loaded in the volatile memory by:
            copying application code for the application from the non-volatile memory into the volatile memory;
            executing the application code from the volatile memory, wherein application data is created after the application code is executed; and
            storing the application data in the volatile memory;
        move the application data for the application from the volatile memory to the non-volatile memory during a swap operation and deleting the application code from the volatile memory for the application, wherein the application data is encrypted before it is stored in the non-volatile memory;
        receiving a request for the application; and
        in response to receiving the request, moving the application data for the application from the non-volatile memory to the volatile memory instead of recreating the application data from scratch; wherein the application data maintains state information of the application.

10. The computing device of claim 9, wherein the non-volatile memory is part of a storage module, and wherein the application data is encrypted by an encryption module in the computing device.

11. The computing device of claim 9, wherein the non-volatile memory is part of a storage module, and wherein the application data is encrypted by an encryption module in the storage module.

12. The computing device of claim 9, wherein the non-volatile memory is part of a storage module, and wherein the application data is encrypted by an encryption module in the computing device and by an encryption module in the storage module.

13. The computing device of claim 9, wherein the non-volatile memory is part of a storage module, and wherein the storage module is embedded in the computing device.

14. The computing device of claim 9, wherein the non-volatile memory is part of a storage module, and wherein the storage module is removably connected to the computing device.

15. The computing device of claim 9, wherein the computing device is a mobile device.

16. The computing device of claim 9, wherein the non-volatile memory has a three-dimensional configuration.

17. A computing device comprising:
a volatile memory;
a non-volatile memory:
means for loading an application in the volatile memory, wherein the application is loaded in the volatile memory by:
  copying application code for the application from the non-volatile memory into the volatile memory;
  executing the application code from the volatile memory, wherein application data is created after the application code is executed; and
  storing the application data in the volatile memory;
means for moving the application data for the application from the volatile memory to the non-volatile memory during a swap operation and deleting the application code from the volatile memory for the application, wherein the application data is encrypted before it is stored in the non-volatile memory;
means for receiving a request for the application; and
means for, in response to receiving the request, moving the application data for the application from the non-volatile memory to the volatile memory instead of recreating the application data from scratch; wherein the application data maintains state information of the application.

* * * * *